(12) United States Patent
Hino

(10) Patent No.: US 7,990,569 B2
(45) Date of Patent: Aug. 2, 2011

(54) SPEEDING UP REMOTE COPY OPERATION BY TRANSMITTING RESOLUTION-DEPENDENT PRINT DATA VIA NETWORK IF PROCESSING APPARATUS AND OUTPUT APPARATUS INFORMATION MATCH

(75) Inventor: Yasuhiro Hino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 598 days.

(21) Appl. No.: 12/169,587

(22) Filed: Jul. 8, 2008

(65) Prior Publication Data
US 2009/0015878 A1    Jan. 15, 2009

(30) Foreign Application Priority Data

Jul. 12, 2007  (JP) .................................. 2007-183644

(51) Int. Cl.
G06F 3/12   (2006.01)
G06F 5/01   (2006.01)
G06F 15/16  (2006.01)
(52) U.S. Cl. ....................... 358/1.2; 358/1.15; 358/1.16
(58) Field of Classification Search .................. 358/1.2, 358/1.13, 1.15, 1.16, 528, 451, 504, 406; 382/298, 299; 709/220, 228, 246
See application file for complete search history.

(56) References Cited

U.S. PATENT DOCUMENTS
2009/0213406 A1 * 8/2009 Kimura ..................... 358/1.13
2010/0002257 A1 * 1/2010 Isshiki ...................... 358/1.15

FOREIGN PATENT DOCUMENTS
JP      8-163345    6/1996
JP     11-331455   11/1999
JP    2006-023942   1/2006
* cited by examiner Primary Examiner — Scott A Rogers
(74) Attorney, Agent, or Firm — Fitzpatrick, Cella, Harper & Scinto

(57) ABSTRACT

An image processing apparatus includes a resolution-independent data generation unit which generates resolution-independent data, which does not depend on a resolution, from input data, a resolution-dependent data generation unit which generates resolution-dependent data, which depends on a resolution and is used to be rendered to bitmap data, from the generated resolution-independent data, a saving unit which saves the generated resolution-independent data and the generated resolution-dependent data, an apparatus information acquisition unit which acquires image output apparatus information associated with the image output apparatus, an apparatus information determination unit which determines whether or not the image output apparatus information matches image processing apparatus information associated with the image processing apparatus, and a data transmission unit which transmits the resolution-dependent data as the output data when it is determined that the image output apparatus information matches the image processing apparatus information.

10 Claims, 23 Drawing Sheets

F I G. 22
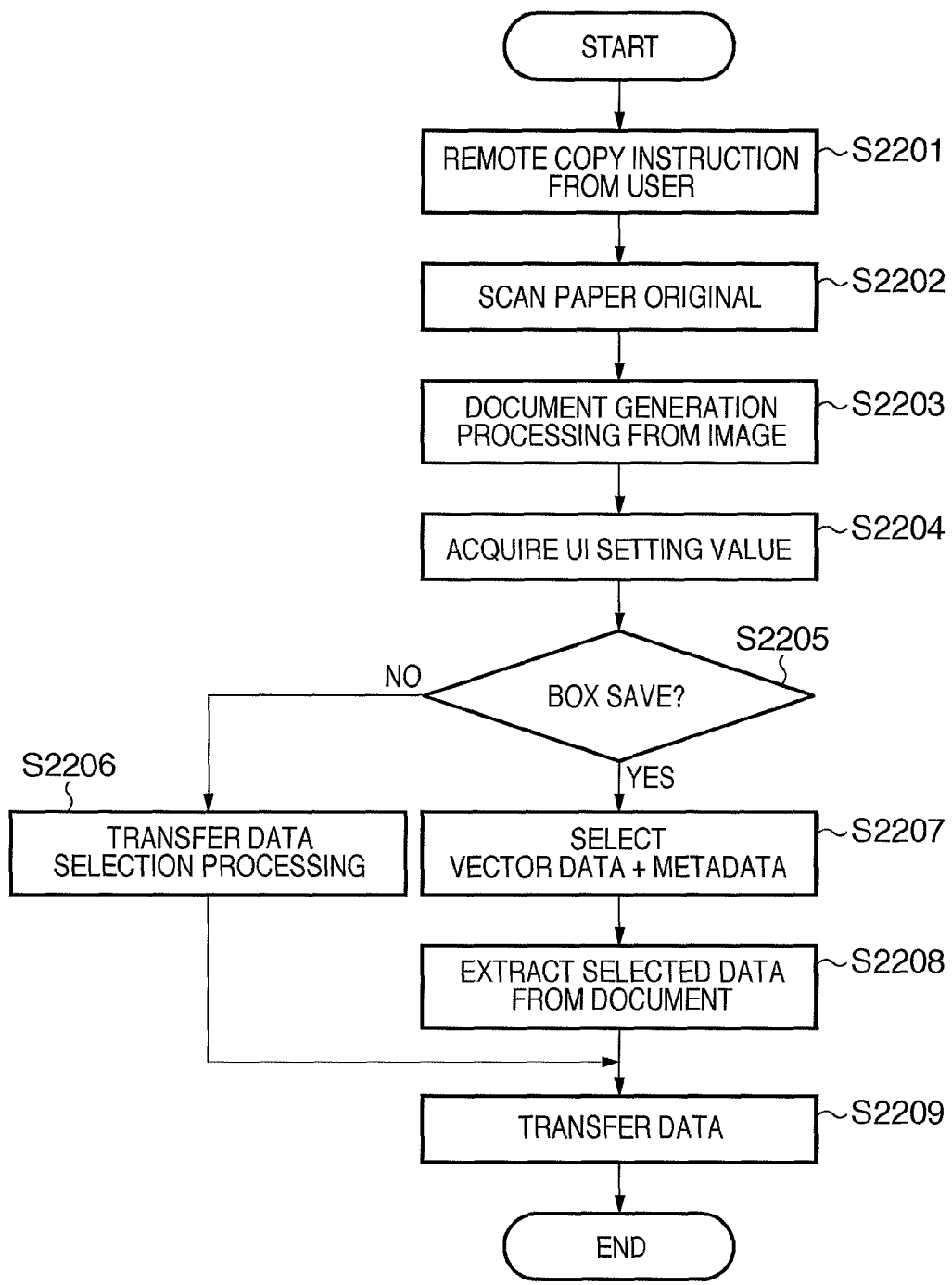

SPEEDING UP REMOTE COPY OPERATION BY TRANSMITTING RESOLUTION-DEPENDENT PRINT DATA VIA NETWORK IF PROCESSING APPARATUS AND OUTPUT APPARATUS INFORMATION MATCH

BACKGROUND OF THE INVENTION

1. Field of the Invention

The present invention relates to an image processing apparatus which exchanges print data with another apparatus via a network.

2. Description of the Related Art

Conventionally, a remote copy technique that outputs image data input by an image input apparatus such as a scanner or the like connected to a network to an independent image output apparatus represented by a printer or the like is popularly used. In general, a processing mode in which scan and print operations in the conventional copy operation are executed by different apparatuses on the network so that an original image scanned by the image input apparatus is printed out by the image output apparatus is called "remote copy". On the other hand, a processing mode in which a series of operations from the scan operation to the print operation are executed by a single apparatus is known as "local copy".

When the local copy function cannot be used since the printer function of the image input apparatus executes, for example, print processing of another job by the remote copy function, that image input apparatus can control another apparatus on the network to alternatively execute the print operation using its remote copy function. Also, when a copy output is manually distributed to a user at a remote place, it can be printed out by an apparatus placed near that user using the remote copy function, thus saving the man-hours required for such manual distribution.

Various techniques have been developed in association with such remote copy technique. Japanese Patent Laid-Open No. 11-331455 discloses a remote copy system which can select an optimal image output apparatus based on the copy condition set by a system user. Japanese Patent Laid-Open No. 8-163345 discloses an image processing apparatus which synchronously outputs input image data to a plurality of image processing apparatuses to improve productivity.

Furthermore, in recent years, as described in Japanese Patent Laid-Open No. 2006-23942, a technique that converts bitmap data input by, for example, scanning or the like into resolution-independent vector data has also been developed. Using such technique, upon execution of the remote copy, data can be sent to the image output apparatus in the vector data format. Furthermore, in this case, since the image output apparatus renders the vector data to bitmap data, the bitmap data need not undergo resolution conversion. Therefore, image deterioration of the bitmap data due to the resolution conversion processing can be prevented, thus implementing a high-quality remote copy.

However, in such high-quality remote copy system, since the image output apparatus needs to sequentially interpret and render vector data that describes complicated rendering data, the number of processing steps increases, resulting in a long remote copy processing time.

SUMMARY OF THE INVENTION

The present invention provides an image processing apparatus which can speed up the processing in a remote apparatus upon execution of the remote copy.

According to the first aspect of the present invention, there is provided a image processing apparatus for transmitting output data to an external image output apparatus according to a remote copy instruction, the apparatus comprises:

a resolution-independent data generation unit configured to generate resolution-independent data, which does not depend on a resolution, from input data;

a resolution-dependent data generation unit configured to generate resolution-dependent data, which depends on a resolution and is used to be rendered to bitmap data, from the resolution-independent data generated by the resolution-independent data generation unit;

a saving unit configured to save the resolution-independent data generated by the resolution-independent data generation unit and the resolution-dependent data generated by the resolution-dependent data generation unit;

an apparatus information acquisition unit configured to acquire image output apparatus information associated with the image output apparatus;

an apparatus information determination unit configured to determine whether or not the image output apparatus information matches image processing apparatus information associated with the image processing apparatus; and a data transmission unit configured to, when the apparatus information determination unit determines that the image output apparatus information matches the image processing apparatus information, transmit the resolution-dependent data as the output data.

According to the second aspect of the present invention, there is provided an image processing method for transmitting output data to an external image output apparatus according to a remote copy instruction, the method comprises:

a resolution-independent data generation step of generating resolution-independent data, which does not depend on a resolution, from input data;

a resolution-dependent data generation step of generating resolution-dependent data, which depends on a resolution and is used to be rendered to bitmap data, from the generated resolution-independent data;

a saving step of saving the generated resolution-independent data and the generated resolution-dependent data;

an apparatus information acquisition step of acquiring image output apparatus information associated with the image output apparatus;

an apparatus information determination step of determining whether or not the image output apparatus information matches image processing apparatus information associated with an image processing apparatus; and a data transmission step of transmitting, when it is determined that the image output apparatus information matches the image processing apparatus information, the resolution-dependent data as the output data.

According to the third aspect of the present invention, there is provided a computer-readable medium storing a program for transmitting output data to an external image output apparatus according to a remote copy instruction, the program causing a computer to function to:

generate resolution-independent data, which does not depend on a resolution, from input data;

generate resolution-dependent data, which depends on a resolution and is used to be rendered to bitmap data, from the generated resolution-independent data;

save the generated resolution-independent data and the generated resolution-dependent data;

acquire image output apparatus information associated with the image output apparatus;

determine whether or not the image output apparatus information matches image processing apparatus information associated with an image processing apparatus; and transmit, when it is determined that the image output apparatus information matches the image processing apparatus information, the resolution-dependent data as the output data.

According to the fourth aspect of the present invention, there is provided an image processing apparatus for transmitting output data to an external image output apparatus according to a remote copy instruction, the apparatus comprises:

resolution-independent data generation unit configured to generate resolution-independent data, which does not depend on a resolution, from input data; an additional information data generation unit configured to generate additional information data, which is appended to the input data as additional information and is used to search for the input data, from the input data;

a resolution-dependent data generation unit configured to generate resolution-dependent data, which is used to be rendered to bitmap data and depends on a resolution, from the resolution-independent data generated by the resolution-independent data generation unit;

a saving unit configured to save the resolution-independent data generated by the resolution-independent data generation unit, the additional information data generated by the additional information generation unit, and the resolution-dependent data generated by the resolution-dependent data generation unit; and a data transmission unit configured to, when the output data is instructed to be saved in a storage area in the image output apparatus by a user's operation, transmit the resolution-independent data and the additional information data as the output data.

According to the present invention, upon execution of the remote copy, the processing in a remote apparatus can be sped up.

Further features of the present invention will become apparent from the following description of exemplary embodiments with reference to the attached drawings.

BRIEF DESCRIPTION OF THE DRAWINGS

FIG. 22 is a flowchart showing the sequence of transfer data selection processing according to the fourth embodiment of the present invention.

DESCRIPTION OF THE EMBODIMENTS

Figure 1:
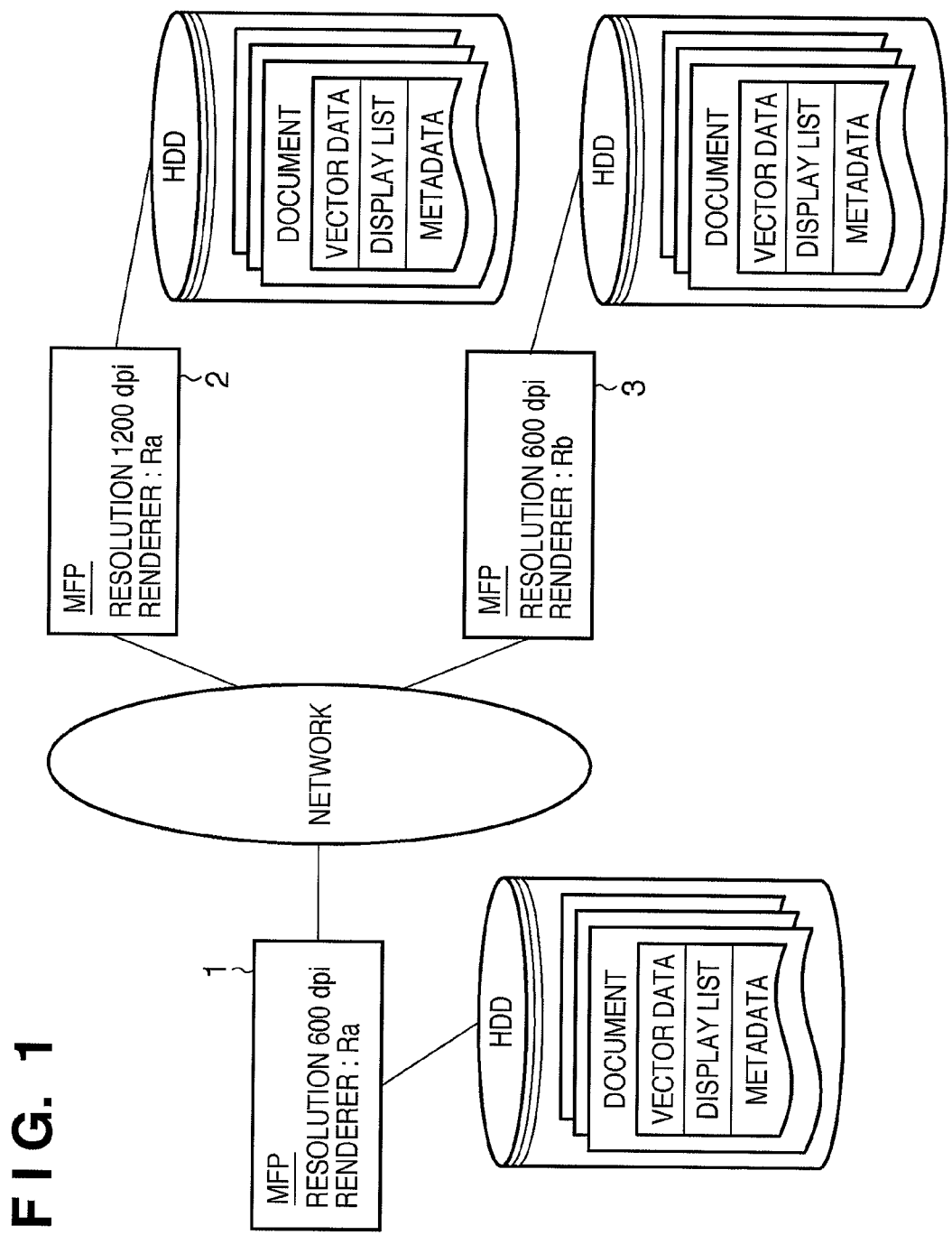
FIG. 1 is a view showing the overall arrangement of an image processing system according to an embodiment of the present invention.

The best mode for carrying out the invention will be described in detail hereinafter with reference to the accompanying drawings. Note that the same reference numerals denote the same components, and a repetitive description thereof will be avoided.

FIG. 1 is a view showing the overall arrangement of an image processing system according to this embodiment. As shown in FIG. 1, in this image processing system, image processing apparatuses 1, 2, and 3 are connected via a network such as a LAN or the like. In this embodiment, an MFP (Multi-Function Peripheral) of a 1D color system is used as the image processing apparatuses 1 to 3. The MFP indicates a multi-function device that combines a variety of functions such as a printer function, copy function, FAX function, scan function, and the like. In the following description, the image processing apparatus will also be referred to as an MFP. In FIG. 1, the MFPs 1, 2, and 3 respectively have secondary storage devices (storage areas). As the secondary storage device, for example, a hard disk drive can be used.

The MFPs 1, 2, and 3 shown in FIG. 1 respectively have unique printer engines. Therefore, the printer engines of the MFPs 1, 2, and 3 respectively have different output resolutions (to be simply referred to as resolutions hereinafter). In this embodiment, assume that the resolutions of the printer engines in the MFPs 1 and 3 are 600 dpi, and that of the printer engine in the MFP 2 is 1200 dpi. The MFPs 1, 2, and 3 respectively have unique renderers. The renderer is also called a rasterizer, which is normally implemented by hardware such as an ASIC or the like. The renderer can process rendering instructions to render them to bitmap data. The rendering instructions to be processed by the renderer are generally called a display list, which can be generated by software based on vector data described using complicated rendering information. Such display list is resolution-dependent data depending on the resolution of the printer engine equipped in the apparatus since it can be processed by hardware. On the other hand, since the vector data does not depend on the resolution, it will also be referred to as resolution-independent data in this embodiment. In this embodiment, the renderers of the MFPs 1 and 2 are represented by "RA", and that of the MFP 3 is represented by "RB". The MFPs 1, 2, and 3 shown in FIG. 1 can communicate with each other using a network protocol. In FIG. 1, for example, a versatile PC, server, and printer may be connected to the network.

Figure 2:
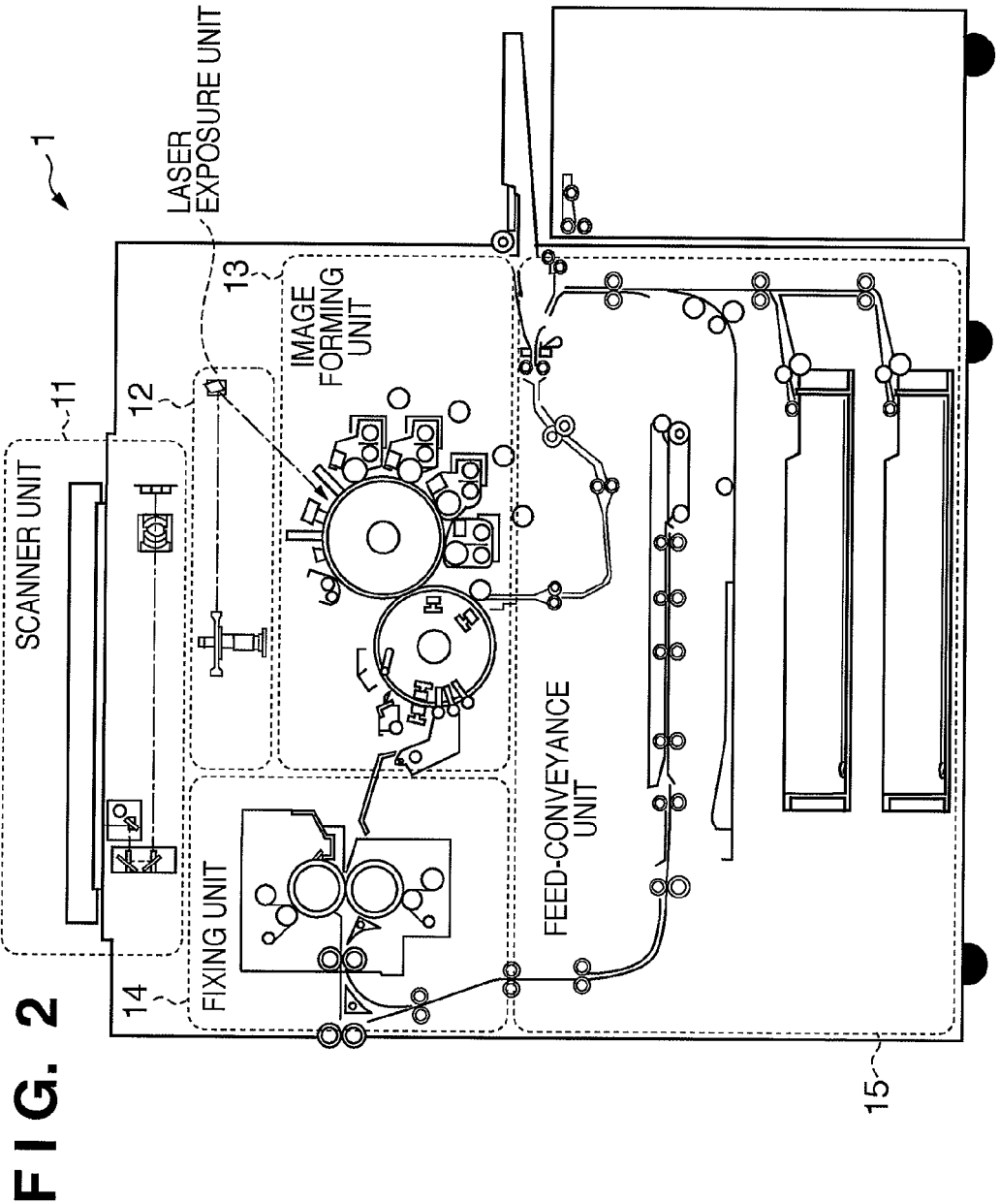
FIG. 2 is a schematic view showing the overall arrangement of an MFP according to the embodiment of the present invention.

FIG. 2 is a schematic view showing the overall arrangement of the MFP according to the embodiment of the present invention. As shown in FIG. 2, the MFP 1 includes a scanner unit 11, laser exposure unit 12, image forming unit 13, fixing unit 14, feed-conveyance unit 15, and a printer control unit (not shown). The scanner unit 11 generates image data by optically scanning an image of an original by irradiating the original placed on a document table with an illumination, and converting the image of the original into an electrical signal. The laser exposure unit 12 emits light rays such as a laser beam or the like modulated according to the generated image data to enter a rotary polygon mirror, which rotates at an equal angular velocity, and irradiates a photosensitive drum with reflected scanning light reflected by the mirror. The image forming unit 13 rotates the photosensitive drum, and charges it by a charger. The image forming unit 13 develops a latent image formed on the photosensitive drum by the laser exposure unit using toner. The developed toner image is transferred onto a sheet, and small residual toner on the photosensitive drum is recovered. By executing such a series of electrophotography processes in the image forming unit 13, an image is formed. During four rotations of a sheet which is conveyed by the feed-conveyance unit 15 and is wound around at the predetermined position of a transfer belt, developing units having magenta (M), cyan (C), yellow (Y), and black (K) toners repeat the electrophotography processes in turn. As a result, a sheet on which a full-color toner image of four colors is transferred leaves a transfer drum, and is conveyed to the fixing unit 14. The fixing unit 14 comprises a combination of rollers and belts, and incorporates a heat source such as a halogen heater or the like. The toner on the sheet on which the toner image is transferred by the image forming unit 13 is melt and fixed by heat and pressure in the fixing unit 14. The feed-conveyance unit 15 has at least one sheet storage such as a sheet cassette, paper deck, and the like. The feed-conveyance unit 15 separates one of a plurality of sheets stored in the sheet storage, and conveys it to the image forming unit 13 or fixing unit 14 in accordance with an instruction from the printer control unit (not shown). The sheet conveyed to the image forming unit 13 is wound around the transfer drum, and is conveyed to the fixing unit 14 after four rotations. As has already been described above, color toner images of magenta, cyan, yellow, and black are transferred onto the sheet during the four rotations. Upon forming images on the two faces of the sheet, the sheet that passed through the fixing unit 14 is controlled to be conveyed to the image forming unit 13 again. The printer control unit (not shown) controls the scanner unit 11, laser exposure unit 12, image forming unit 13, fixing unit 14, and feed-conveyance unit 15 while communicating with an MFP control unit which controls the overall MFP 1.

Figure 3:
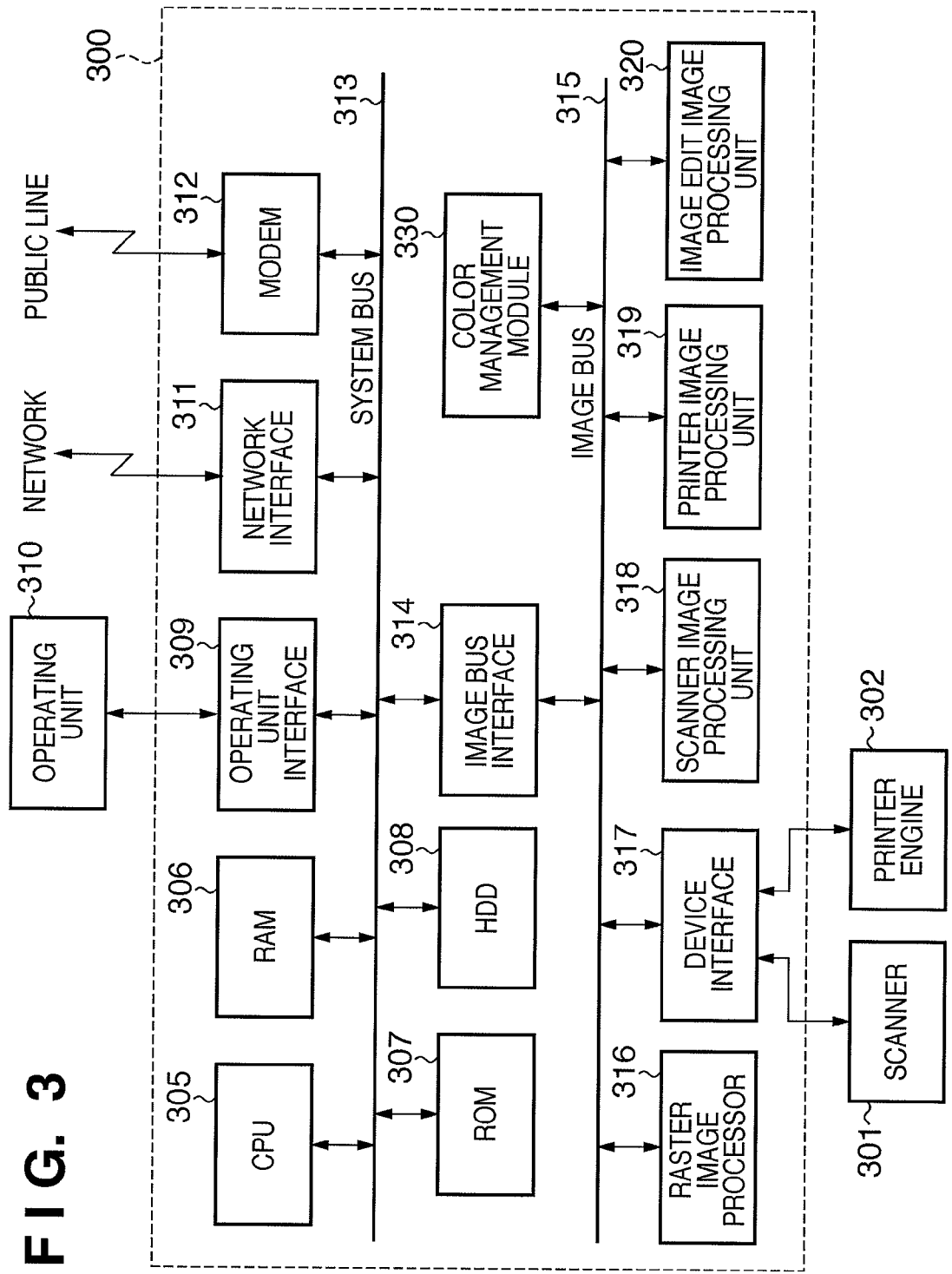
FIG. 3 is a block diagram showing the arrangement of a control unit of the MFP.

FIG. 3 is a block diagram showing the arrangement of a control unit of the MFP. A control unit 300 is connected to a scanner 301 as an image input device and a printer engine 302 as an image output device, and controls them to scan or print out image data. The control unit 300 is connected to a network and public line, and controls to exchange image information, device information, and the like via the network and public line.

A CPU 305 is a central processing unit used to control the overall MFP 1. A RAM 306 is a system work memory used when the CPU 305 operates, and is also used as an image memory for temporarily storing input image data. A ROM 307 is a boot ROM, which stores, for example, a boot program of the system. An HDD 308 is a hard disk drive, which can store, for example, system software for various kinds of processing, and input image data. A operating unit interface 309 is an interface with a operating unit 310 which has a display screen that can display image data and the like, and can output operation window data to the operating unit 310. The operating unit interface 309 supplies information input by the user at the operating unit 310 to the CPU 305. A network interface 311 comprises, for example, a LAN card, and can exchange information with an external apparatus when it is connected to a LAN. Furthermore, a modem 312 is connected to the public line, and can exchange information with an external apparatus. The aforementioned function blocks from the CPU 305 to the modem 312 are connected to a system bus 313 and can communicate with each other.

An image bus interface 314 is a bus bridge which connects the system bus 313 and an image bus 315 that transfers image data at high speed, and can convert the data structure between the system bus 313 and image bus 315. As shown in FIG. 3, a raster image processor 316, device interface 317, scanner image processing unit 318, printer image processing unit 319, image edit image processing unit 320, and color management module 330 are connected to the image bus 315. The raster image processor 316 can render PDL (Page Description Language) code data and vector data to image data. The device interface 317 connects the scanner 301 and printer engine 302 to the control unit 300, and can convert synchronous or asynchronous communications of image data. The scanner image processing unit 318 applies processing such as correction, modification, editing, and the like to image data input from the scanner 301. The printer image processing unit 319 applies processing such as correction, resolution conversion, and the like according to the printer engine 302 to image data to be printed out. The image edit image processing unit 320 applies image processing such as rotation, compression/decompression, and the like to image data. The color management module 330 is a dedicated hardware module which applies color conversion processing to image data based on a profile and calibration data. Note that the profile is information used to convert color image data expressed on a device-dependent color space into a device-independent color space such as "L*a*b* color model" or the like. Also, the calibration data is data used when the color reproduction characteristics of the scanner 301 and printer engine 302 are to be corrected.

Figure 4:
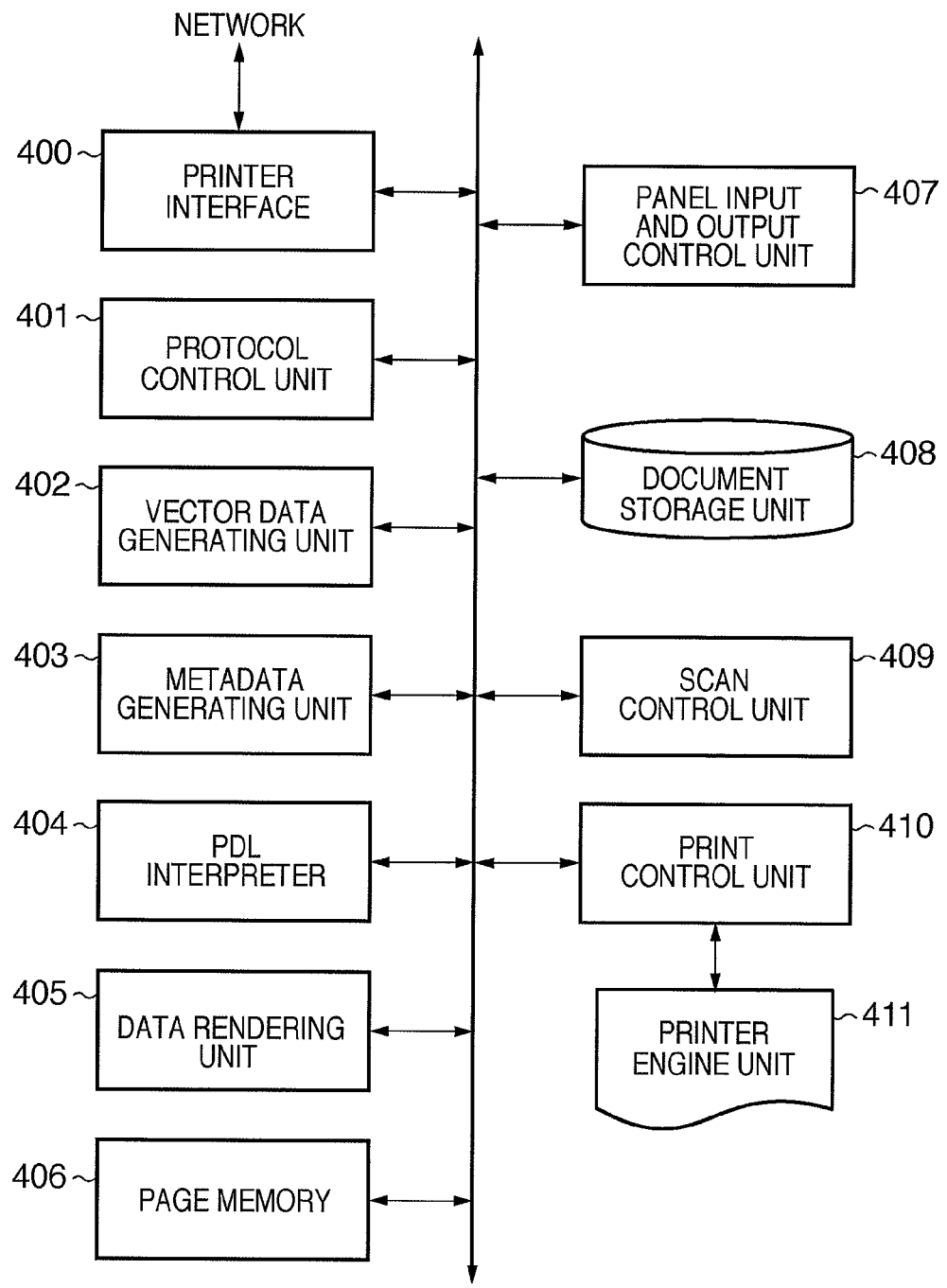
FIG. 4 is a block diagram showing the configuration of software installed in the MFP.

FIG. 4 is a block diagram showing the configuration of software installed in the MFP. The software described in the configuration of FIG. 4 serves as controller software for controlling the operation of the MFP. This controller software is stored in, for example, the HDD 308 to operate the function blocks described using FIG. 3, thereby implementing the functions of the MFP. A printer interface 400 is an interface which communicates with an external apparatus via the network. A protocol control unit 401 interprets protocols in network communications to allow communications of the MFP 1 with an external apparatus. A vector data generating unit 402 generates (to be also referred to as "vectorizes" hereinafter) vector data as a resolution-independent rendering description from bitmap image data. A meta data generating unit 403 generates secondary information obtained during vectorization as metadata. In this embodiment, the generated metadata is used not for rendering but for a file search and the like as additional data in the subsequent processes. A PDL interpreter 404 converts a PDL code to an intermediate code in a format that allows hardware to easily process, for example, the aforementioned display list by interpreting the PDL code. The intermediate code generated by the PDL interpreter 404 is supplied to a data rendering unit 405. The data rendering unit 405 renders the supplied intermediate code into bitmap data by a renderer, and the rendered bitmap data is sequentially stored in a page memory 406 as a volatile memory. A panel input and output control unit 407 controls user's input and output operations on a control panel included in the operating unit 310. A document storage unit 408 is implemented by a secondary storage device such as a hard disk or the like, and stores data files each including vector data, a display list, and metadata for respective jobs of input image data. Such data file will be referred to as a "document" in this embodiment. A scan control unit 409 applies processing such as correction, modification, editing, and the like to image data input by the scanner 301. A print control unit 410 converts the contents of the page memory 406 into a video signal, and transfers the video signal to a printer engine unit 411. The printer engine unit 411 is a print mechanism unit, which forms an image on a print sheet based on the transferred video signal.

Figure 5:
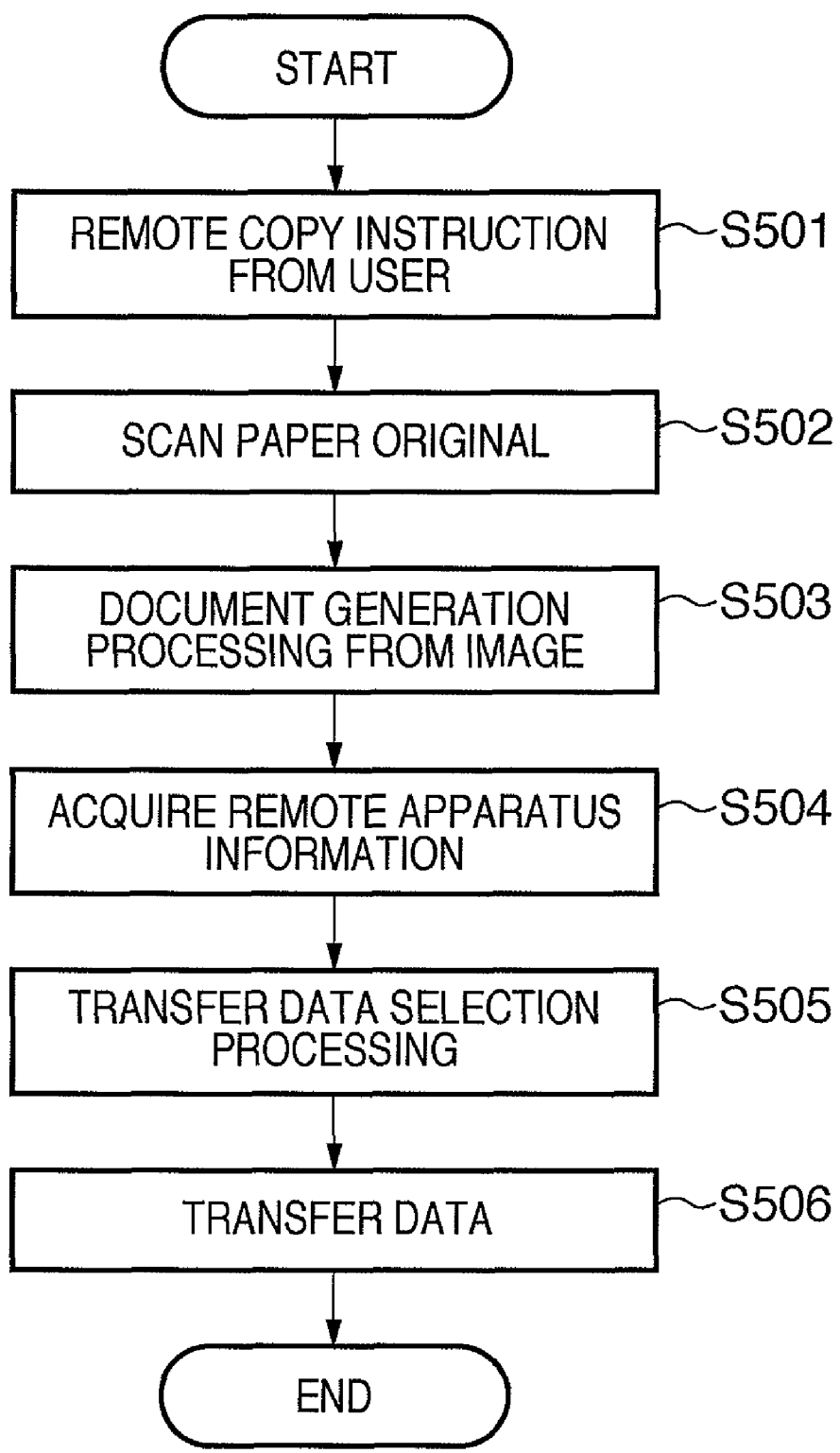
FIG. 5 is a flowchart showing the sequence of processing of the MFP upon execution of a remote copy function according to the embodiment of the present invention.

FIG. 5 is a flowchart showing the sequence of processing of the MFP upon execution of a remote copy function according to the first embodiment of the present invention. The "remote copy" is a processing mode in which scan and print operations in the conventional copy operation are executed by different apparatuses on the network, so that, for example, an original image scanned by the MFP 1 is printed out by the MFP 2. On the other hand, a processing mode in which a series of operations from the scan operation to the print operation are executed by a single apparatus is called "local copy".

For example, when the printer function of the MFP cannot execute the local copy since it executes print processing of another job, the remote copy function can control another apparatus on the network to alternatively execute the print operation. Also, when a copy output is manually distributed to a user at a remote place, it can be printed out by an apparatus placed near that user using the remote copy function, thus saving the man-hour required for such manual distribution. In this embodiment, the MFP that executes the scan operation is called a local MFP and the MFP that executes the printout operation is called a remote MFP.

In this embodiment, upon execution of the remote copy, one of the vector data and display list can be selected as data to be transmitted from the local MFP to the remote MFP. The flowchart shown in FIG. 5 is executed by the CPU 305 in the control unit 300 of the local MFP. Alternatively, the flowchart shown in FIG. 5 may be executed by any of the function blocks included in the control unit 300 under the control of the CPU 305.

In step S501, the user sets an original on the scanner 301, and inputs a remote copy instruction using the control panel or the like included in the operating unit 310. The control unit 300 can starts execution of the remote copy in response to the user's instruction. The user may make settings for execution of the remote copy on the control panel of the operating unit 310, and may press a copy start hardware key added to the MFP 1 to input the remote copy instruction. In step S502, the scanner 301 scans the set original, which is fetched as an image (input data or bitmap data) by the local MFP. In step S503, the CPU 305 generates a document from the fetched image. Details of processing for generating a document based on the bitmap data will be described later. In step S504, the CPU 305 acquires apparatus information of the remote MFP designated by the operating unit 310. That is, in this embodiment, For example, CPU 305 of the local MFP as the image processing apparatus has apparatus information acquisition means (unit) for acquiring image output apparatus information associated with the remote MFP as the image output apparatus. Note that, for example, a general WSD protocol used in an inquiry about capability of each apparatus on the network may be used. The apparatus information to be acquired will be described later.

The process advances to step S505, and the CPU 305 selects data to be transmitted to the remote MFP from the generated document based on the acquired apparatus information.

Finally, in step S506 the CPU 305 transmits the selected data as a new document to the remote MFP, thus ending the processing.

As described above, according to this embodiment, upon execution of the remote copy, since the data to be transmitted to the remote MFP can be selected according to the acquired apparatus information of the remote MFP, execution of the remote copy can be sped up. Details will be described below.

Figure 6:
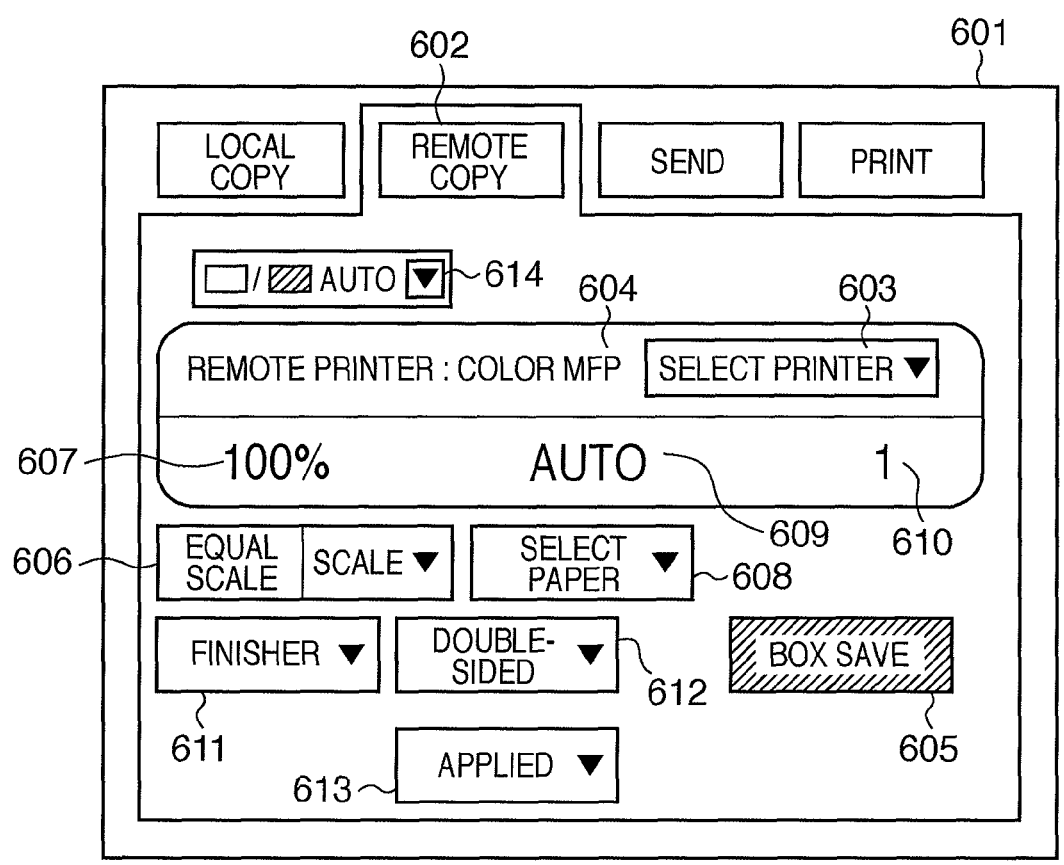
FIG. 6 shows an example of a window displayed on a operating unit of a local MFP when the user instructs a remote copy.

FIG. 6 shows an example of a window displayed on the operating unit of the local MFP when the user inputs a remote copy instruction. A window 601 is a window displayed on the operating unit so as to allow the user to make the settings of the remote copy and to start the remote copy, and is displayed when the user presses a remote copy mode button 602. In step S501 shown in FIG. 5 already described above, the user can make the settings about the remote copy using the window shown in FIG. 6.

When the user presses a printer selection button 603, a pull-down list (not shown) of remote apparatuses, which can be designated as the remote copy output destination, is displayed to allow the user to select a desired remote apparatus. The name of the selected remote apparatus is displayed in a display field 604. A list of remote apparatuses that can be designated as the remote copy output destination may be held in the apparatus in advance. Alternatively, the list of remote apparatuses that can be designated may be acquired from a server or the like, which is connected to the network and manages such list. Also, a packet that searches for apparatuses which can accept a remote copy request may be broadcast onto the network, and a list of apparatuses which return a response may be generated.

A button 605 is a box save selection button used to select whether or not to save in a secondary storage device (to be also referred to as a box hereinafter) of the remote apparatus upon execution of the remote copy. In this embodiment, the box save selection button is a toggle control button; when this button is pressed once, it is set in a selected state, and when the button is pressed again, it is set in an unselected state.

A scale designation button 606 allows the user to designate an enlargement or reduction scale in the remote copy mode. Upon pressing the scale designation button 606, a scale designation window (not shown) is displayed, and the user can designate an enlargement or reduction scale on the window.

Upon pressing "equal scale" of the scale designation button 606, the user can designate an enlargement/reduction scale=100% without displaying the scale designation window. The enlargement or reduction scale designated by the user is displayed on a display field 607.

A paper selection button 608 allows the user to select a paper sheet used in the printout operation. When the user presses the paper selection button 608, a list of paper sizes that can be selected in the printout operation is displayed. A paper size selected as a paper sheet used in the printout operation is displayed on a display field 609. In this embodiment, "AUTO" is selected. As a result, an original size is detected upon scanning the original, and an optimal output sheet is automatically selected in consideration of the enlargement or reduction scale of user's choice.

A display field 610 displays the number of copies upon execution of the remote copy. The user can set the number of copies by operating hardware keys (not shown). A finishing setting button 611 allows the user to make finisher settings. Upon pressing the finishing setting button 611, a finisher setting window (not shown) is displayed, and the user can make settings associated with various finishing modes such as a sort mode, staple mode, puncher mode, and the like for printed paper sheets.

A double-sided designation button 612 allows the user to designate a double-sided copy mode. Upon pressing the double-sided designation button 612, a double-sided setting window (not shown) is displayed, and the user can set a double- or single-sided mode, and the binding direction and the like upon setting the double-sided mode. An applied function setting button 613 allows the user to make applied function settings. Upon pressing the applied function setting button 613, the user can set advanced applied functions of the MFP such as a page continuous shot mode, bookbinding mode, reduced-scale layout setting, and the like. A color mode setting button 614 allows the user to set a color mode. Upon pressing the color mode setting button 614, a list of "color copy", "monochrome copy", and "AUTO" is displayed, and the user can select a desired item. Upon selection of "color copy" or "monochrome copy", the printout operation is made in the selected mode. On the other hand, upon selection of "AUTO", whether an original is a color or monochrome original is automatically determined upon scanning the original, and the color copy mode is executed for the color original or the monochrome copy mode is executed for the monochrome original.

Processing for generating a document including vector data, a display list, and metadata in this embodiment will be described below.

Figure 7:
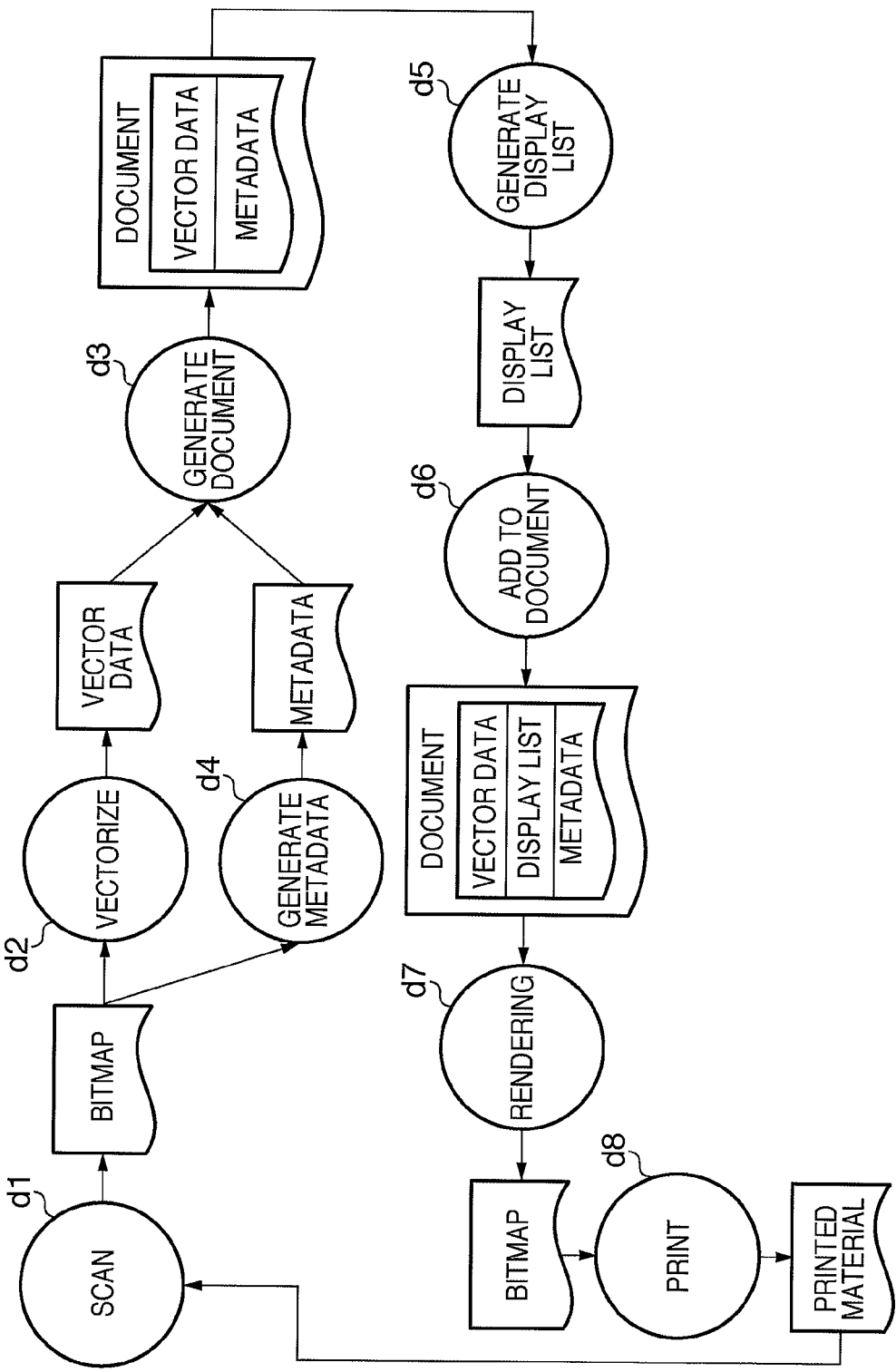
FIG. 7 is a flowchart showing an overview of the overall sequence upon generation of a document at the time of a scan operation.

FIG. 7 is a flowchart showing an overview of the overall sequence upon generation of a document at the time of the scan operation. Scan processing d1 converts a paper original set on the scanner unit 11 into bitmap data. Next, vectorize processing d2 and metadata generation processing d4 generate resolution-independent vector data and metadata from the bitmap data. That is, for example, CPU 305 of the image processing apparatus serving as the local MFP has resolution-independent data generation means (unit) for generating resolution-independent vector data, and additional information data generation means (unit) for generating metadata as additional information data.

Document generation processing d3 generates a document by associating the vector data and metadata. Next, display list generation processing d5 generates a display list from the vector data included in the document. That is, for example, CPU 305 of the image processing apparatus serving as the local MFP has resolution-dependent data generation means (unit) for generating a resolution-dependent display list. The generated display list is stored in the document, and is rendered to bitmap data by rendering processing d7. Print processing d8 prints the rendered bitmap data on a paper medium as a printed material. When the output printed material is set on the scanner unit 11 again, the processes from the scan processing d1 can be repeated.

Figure 8:
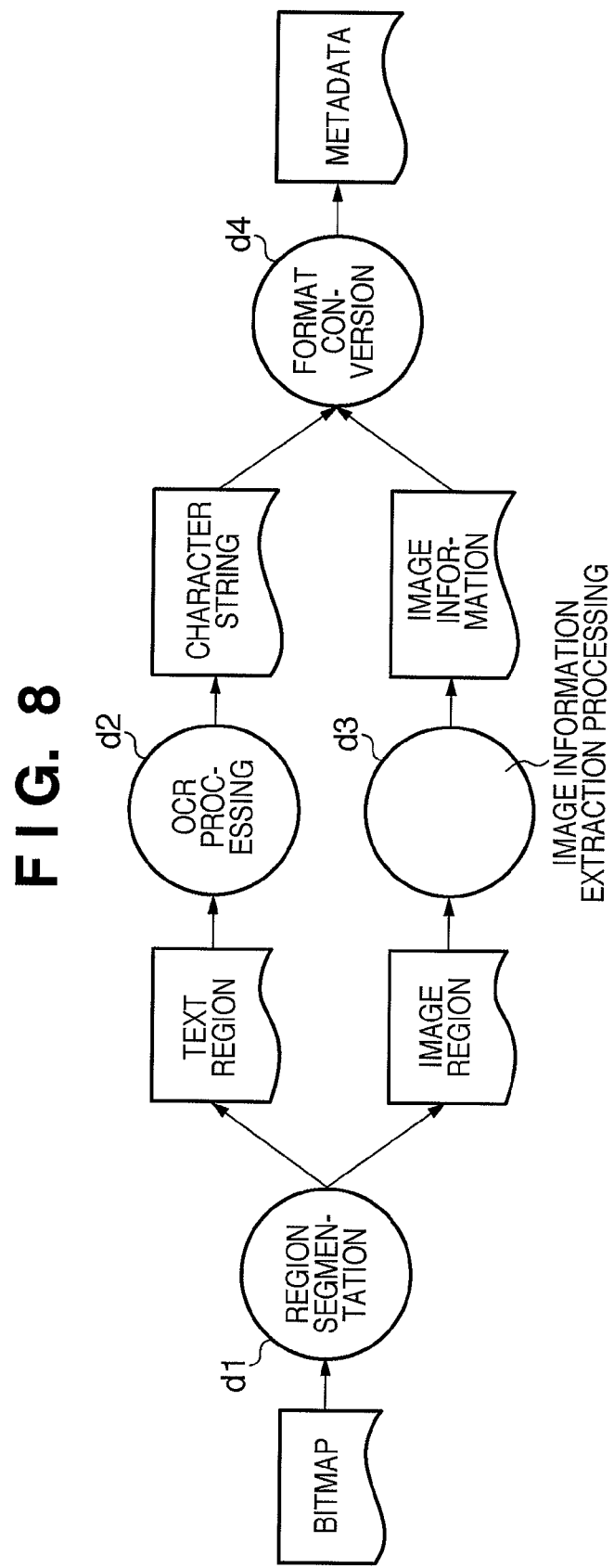
FIG. 8 is a flowchart showing the sequence of metadata generation processing in FIG. 7.

FIG. 8 is a flowchart showing the sequence of the processes in the metadata generation processing d4 in FIG. 7. As shown in FIG. 8, region segmentation processing d1 applies region segmentation to the bitmap data. Note that the region segmentation analyzes input bitmap image data to segment the image data into regions for respective objects included in the image data, and determines and categorizes attributes of the respective regions. The attributes include, for example, text "TEXT", image "PHOTO", line "LINE", figure "PICTURE", and table "TABLE".

Figure 9:
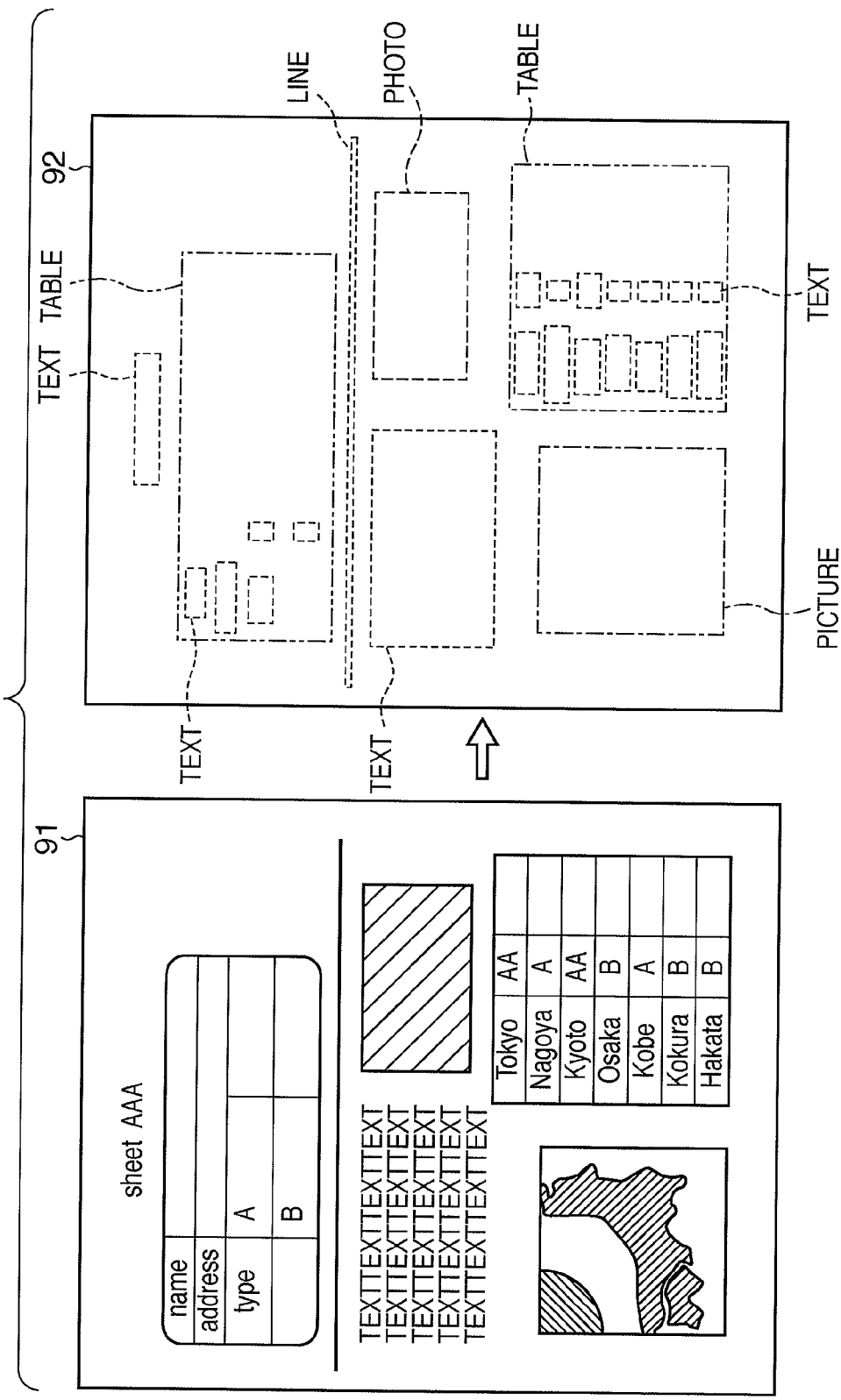
FIG. 9 shows an example obtained upon application of region segmentation to an input image.

An example of the region segmentation will be described below. FIG. 9 shows an example obtained upon applying the region segmentation to an input image. A result of the region segmentation applied to an input image 91 is a determination result 92. Each part bounded by the dotted line in the determination result 92 represents one object unit generated as a result of analyzing the image. The type of an attribute appended to each object unit is the determination result of the region segmentation.

OCR processing d2 applies character recognition processing to each region indicated by the text attribute of those categorized for respective attributes to convert that region into a character string. That is, the converted character string is that printed on a sheet surface. Image information extraction processing d3 converts, into image information, each region indicated by the image attribute of those categorized for respective regions. Note that the image information is a character string that represents the feature of an image, that is, a character string "flower", "face", or the like. The image information extraction processing may use generally known image processing techniques such as image feature detection for detecting image features such as the frequencies, densities, and the like of pixels which form an image, facial recognition, and the like. Format conversion processing d4 converts the generated character strings and image information to a data format (to be described later), thus generating metadata.

Figure 10:
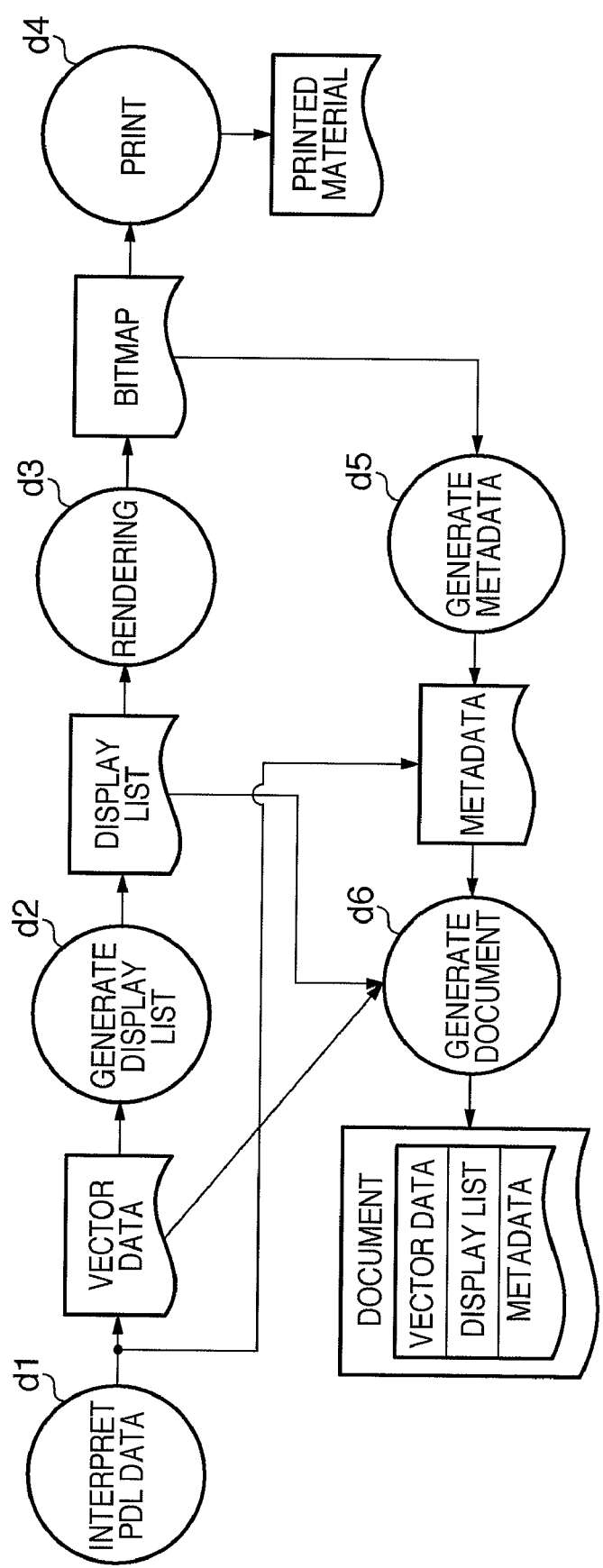
FIG. 10 is a flowchart showing an overview of the overall sequence upon generation of a document in a PDL print mode.

FIG. 10 is a flowchart showing an overview of the overall sequence for generating a document in a PDL print mode. The PDL print mode is a printer operation that outputs an image based on a page description language generated by a printer driver when the user, for example, issues a print instruction from application software installed in a general-purpose PC. In this embodiment, for example, LIPS (LBP Image Processing System, registered trademark) and PS (PostScript, registered trademark) are used as the PDL.

As shown in FIG. 10, PDL data interpretation processing d1 interprets received PDL data to generate vector data. Display list generation processing d2 generates a display list from the vector data. The generated display list is sent to rendering processing d3, and is rendered to bitmap data. Print processing d4 prints the rendered bitmap data on a paper medium, thus forming a printed material. As described above using FIG. 8, metadata generation processing d5 generates the character strings and image information as metadata from the bitmap data generated by the rendering processing d3. In the sequence shown in FIG. 10, document generation processing d6 stores the generated vector data, display list, and metadata in a document. Upon generating metadata in FIG. 10, if the PDL data has character string information, metadata may be generated from the character string information upon interpreting the PDL data, and may be stored in the document.

Figure 11:
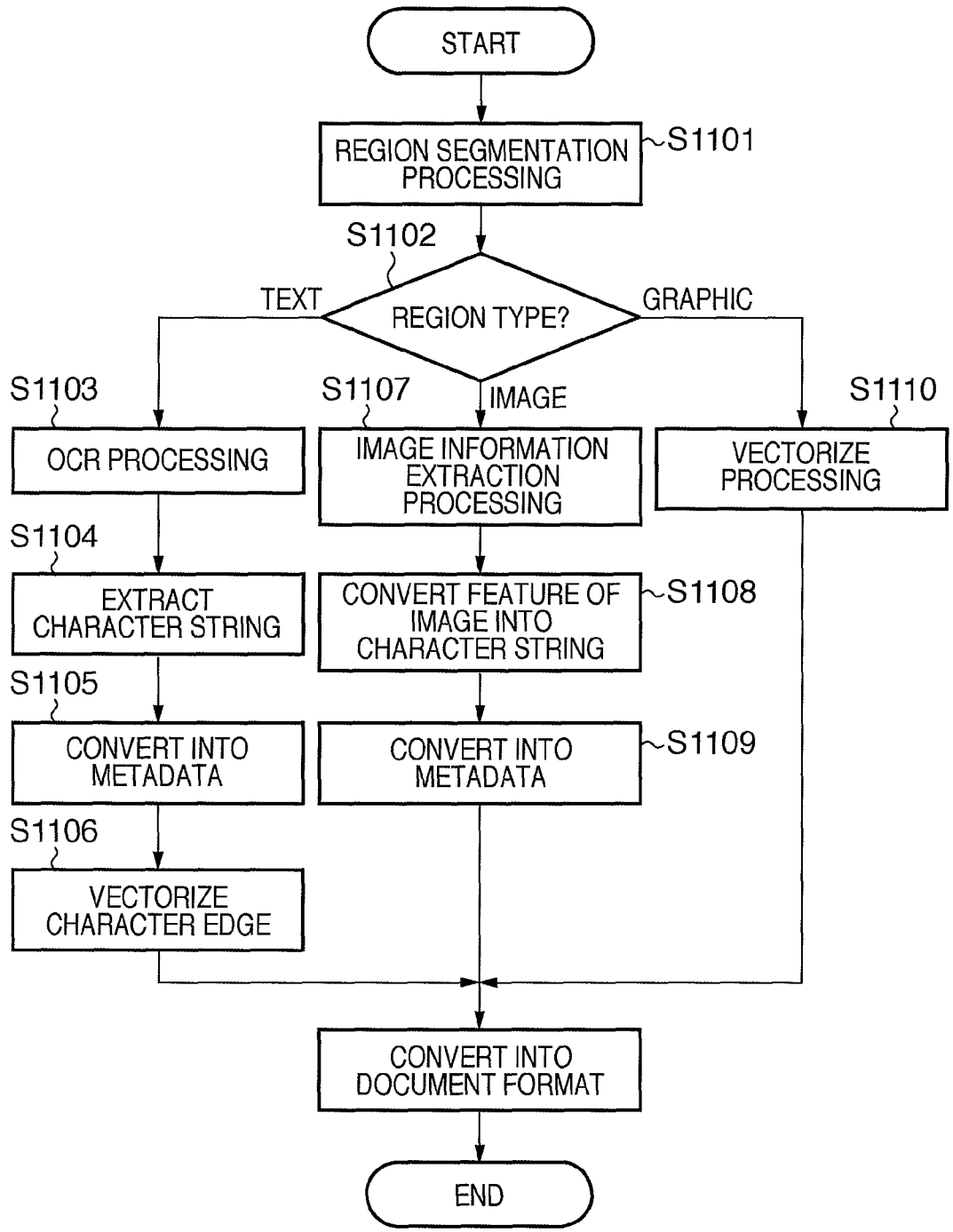
FIG. 11 is a flowchart showing the sequence for generating vector data and metadata in association with segmented region types.

The sequences for generating the vector data and metadata have been described using FIGS. 7 and 8. In practice, respective processes are often executed for the segmented region types of the bitmap data. FIG. 11 is a flowchart showing the sequence for generating vector data and metadata in correspondence with the segmented region types.

In step S1101, the same region segmentation processing as in the description of FIG. 8 is executed. In step S1102, the region types, that is, the attributes are categorized to "TEXT", "GRAPHIC", and "IMAGE". For example, of the attributes categorized in FIG. 9, "PHOTO" and "PICTURE" are categorized to "IMAGE", and "LINE" and "TABLE" are categorized to "GRAPHIC". If the attribute of a region is "TEXT" in step S1102, the process advances to step S1103 to execute OCR processing, and a character string is extracted in step S1104. Furthermore, the character string is converted into metadata in step S1105, and character edges are converted into vector data in step S1106. The metadata converted from the character string is a list of character codes, and is used in a keyword search of files and the like in this embodiment. However, the OCR processing in step S1103 can recognize character codes, but cannot recognize fonts such as Ming typeface, Gothic typeface, and the like, the character sizes such as 10 pt and the like, and font attributes such as Italic, Bold, and the like. However, in this embodiment, since the character edges are converted into vector data in step S1106, information required upon rendering can be included.

If the attribute of a region is "IMAGE" in step S1102, the process advances to step S1107 to execute image information extraction processing. In step S1107, image features are detected using a generally known image processing technique such as image feature amount detection, facial recognition, and the like as in the description of FIG. 8. The process then advances to step S1108 to convert the image features detected in step S1107 into character strings. Note that, for example, the MFP 1 may hold a correspondence table between parameters indicating features and character strings in the HDD 308 or the like. In step S1109, the character strings are converted into metadata. If the attribute of a region is "IMAGE", image data is held intact as vector data. If the attribute of a region is "GRAPHIC" in step S1102, the process advances to step S1110 to execute vectorize processing.

In this embodiment, the document which includes the vector data, display list, and metadata is generated, and that document is printed in the remote copy mode. The document print sequence in this embodiment will be described below.

Figure 12:
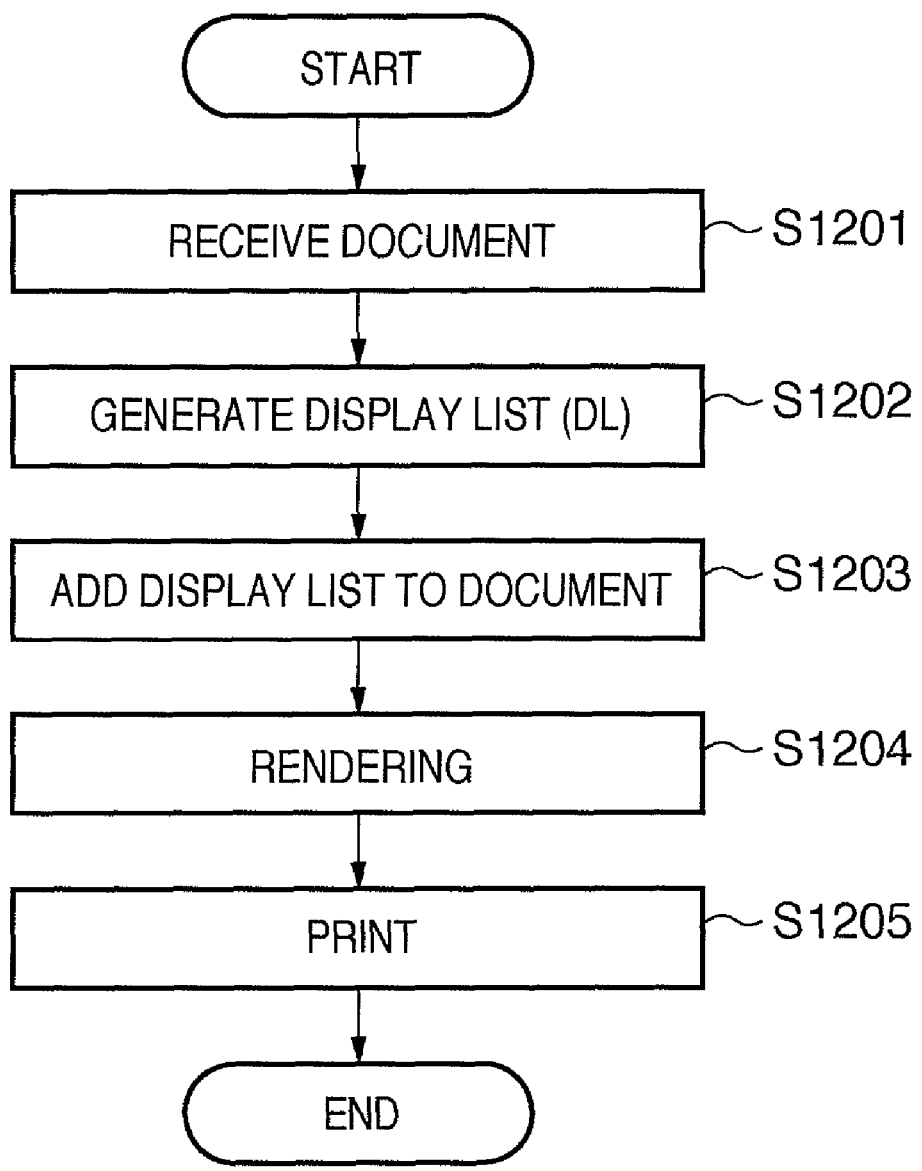
FIG. 12 is a flowchart showing the sequence of processing for printing a generated document.

FIG. 12 is a flowchart showing the sequence of processing for printing a generated document. Note that FIG. 12 does not show any step of sending data from the local MFP to the remote MFP.

In step S1201, the print control unit 410 receives the document generated from the bitmap data (the document generation processing d3 shown in FIG. 8). In step S1202, a display list is generated from the vector data included in the document. In step S1203, the generated display list is added to the document. In step S1204, the display list is extracted from the document, and is rendered to bitmap data. Finally, print processing of the rendered data (output data) onto a paper medium is executed in step S1205.

Figure 13:
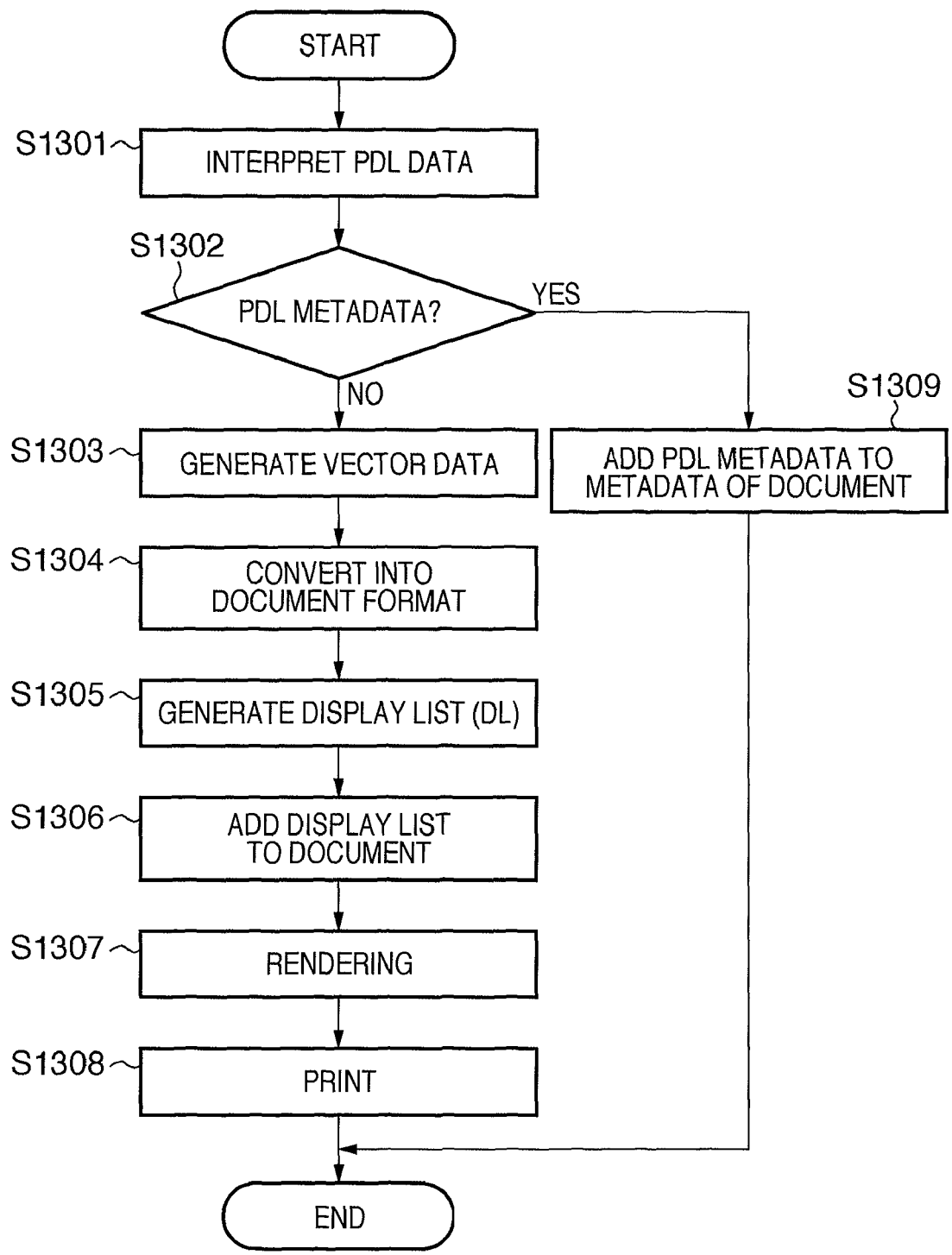
FIG. 13 is a flowchart showing the sequence of print processing of a generated document in the PDL print mode.

FIG. 13 is a flowchart showing the sequence of print processing of a generated document in the PDL print mode. Note that FIG. 13 does not show any step of sending data from the local MFP to the remote MFP as in FIG. 12.

In step S1301, PDL data is interpreted. In step S1302, if the PDL data includes metadata such as character string information and the like, that metadata is added to a document by independent processing (step S1309). Data other than the metadata are converted into vector data in step S1303, and a document is generated in step S1304. In step S1305, a display list is generated from the vector data. In step S1306, the generated display list is added to the document. In step S1307, the display list is extracted from the document, and is rendered to bitmap data. Finally, print processing of the rendered data (output data) onto a paper medium is executed in step S1308.

The format of the document generated in this embodiment will be described below.

Figure 14:
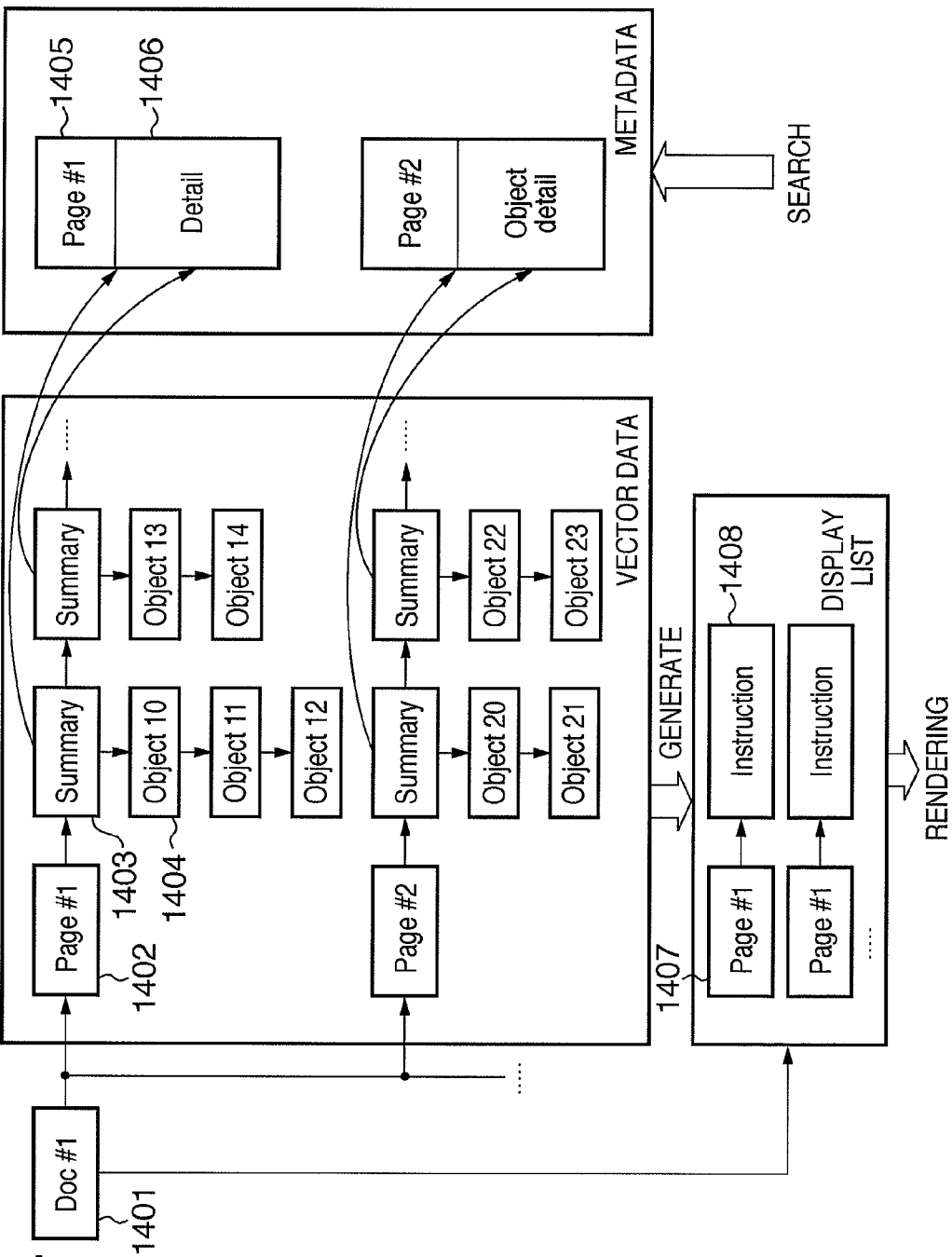
FIG. 14 shows the data structure of a document.

FIG. 14 shows the data structure of the document. As shown in FIG. 14, the document includes the vector data, metadata, and display list, each of which has a plurality of pages. Also, as shown in FIG. 14, the document has a hierarchical structure to have a document header 1401 as an uppermost layer. The vector data and display list respectively have page headers 1402 and 1407, which are located in lower layers of the document header 1401. Since the document header 1401 describes the storage locations of the vector data and display list in a memory or the like, the vector data and display list are associated with each other via the document header 1401. In the vector data, summaries 1403 are configured in lower layers of a plurality of page headers 1402. The vector data is rendering data which does not depend on the resolution of the printer engine, and each page header 1402 describes layout information including the size, orientation, and the like of a page. As shown in FIG. 14, a plurality of summaries are associated with each other, and objects 1404 are configured in lower layers of the respective summaries. To the objects 1404, rendering data such as a line, polygon, Bezier curve, and the like are linked one by one, and a plurality of objects are associated with one summary 1403 together. Each summary 1403 describes information that summarizes the features of the plurality of objects, and describes, for example, the attribute information of segmented regions described in FIG. 9.

The metadata shown in FIG. 14 is not related to the rendering processing, and is used as additional information for, for example, a file search. As shown in FIG. 14, the metadata has a plurality of pieces of information each including page information 1405 and detailed information 1406. In this embodiment, the page information 1405 describes, for example, information indicating that metadata is generated from the bitmap data or PDL data, and the detailed information 1406 describes, for example, a character code string generated as OCR information or image information. In this embodiment, the summary 1403 of the vector data can refer to the detailed information 1406 of the corresponding page information 1405 of the metadata.

The display list shown in FIG. 14 is an intermediate code used upon rendering to bitmap data by the renderer. As shown in FIG. 14, the display list includes the page headers 1407 and rendering instructions 1408. In this embodiment, each page header 1407 describes a management table of rendering information (instruction) in that page, and the like, and the instruction 1408 includes that which depends on the resolution of the printer engine.

Figure 15:
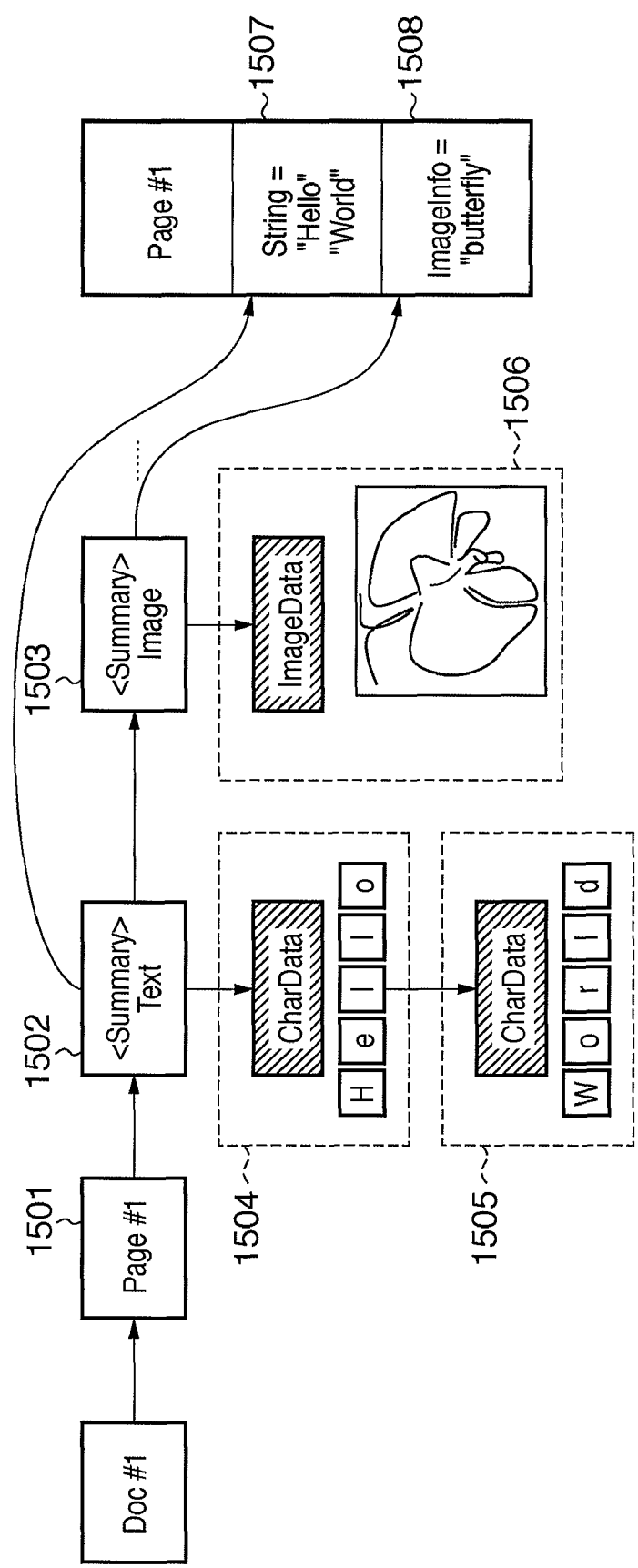
FIG. 15 shows an example of the data configuration of a document.

FIG. 15 shows an example of the data configuration of the document. As shown in FIG. 15, a page header 1501 indicating the first page includes a summary 1502 having attribute information "TEXT" and a summary 1503 having attribute information "IMAGE". To an object 1504 associated with the summary 1502, vector data indicating the character edges of characters "Hello" are linked. Also, to an object 1505, vector data indicating the character edges of characters "World" are linked. To an object 1506 associated with the summary 1503, for example, a photo image of a butterfly in the JPEG format is linked. The summary 1502 refers to a character code string included in a field 1507 of the detailed information of the metadata, and the summary 1503 refers to image information "butterfly" included in a field 1508 of the detailed information of the metadata. In this embodiment, for example, upon searching text in a page using a keyword "World", the field 1507 in the detailed information of the metadata is referred to.

Figure 16A:
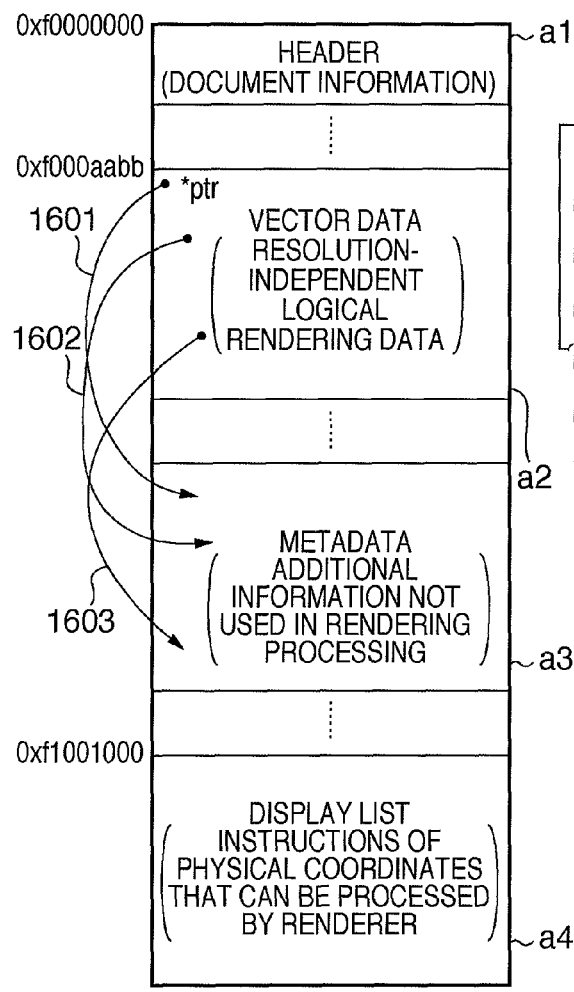
FIG. 16A shows an example of the document shown in FIG. 14 allocated on a memory.
Figure 16B:
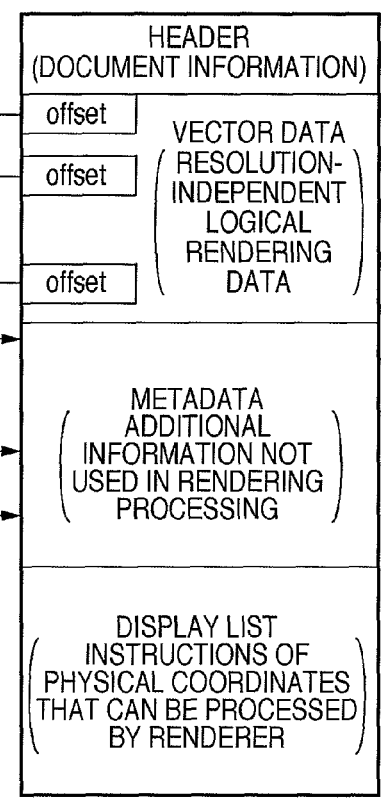
FIG. 16B shows an example of the document shown in FIG. 14 allocated on a file.

FIGS. 16A and 16B show examples of the document shown in FIG. 14, which is allocated on a memory or file. FIG. 16A shows an example of the document shown in FIG. 14, which is allocated at addresses on the memory. As shown in FIG. 16A, a vector data area, metadata area, and display list area of the document are allocated at arbitrary addresses on the memory. Arrows 1601, 1602, and 1603 indicate references from the vector data to the metadata, as described in FIG. 15. As shown in FIG. 16B, a vector data area, metadata area, and display list area are serialized in a single file. In FIG. 16A, the vector data refers to the metadata using pointers. However, in FIG. 16B, the vector data refers to the metadata using offset information.

Figure 17:
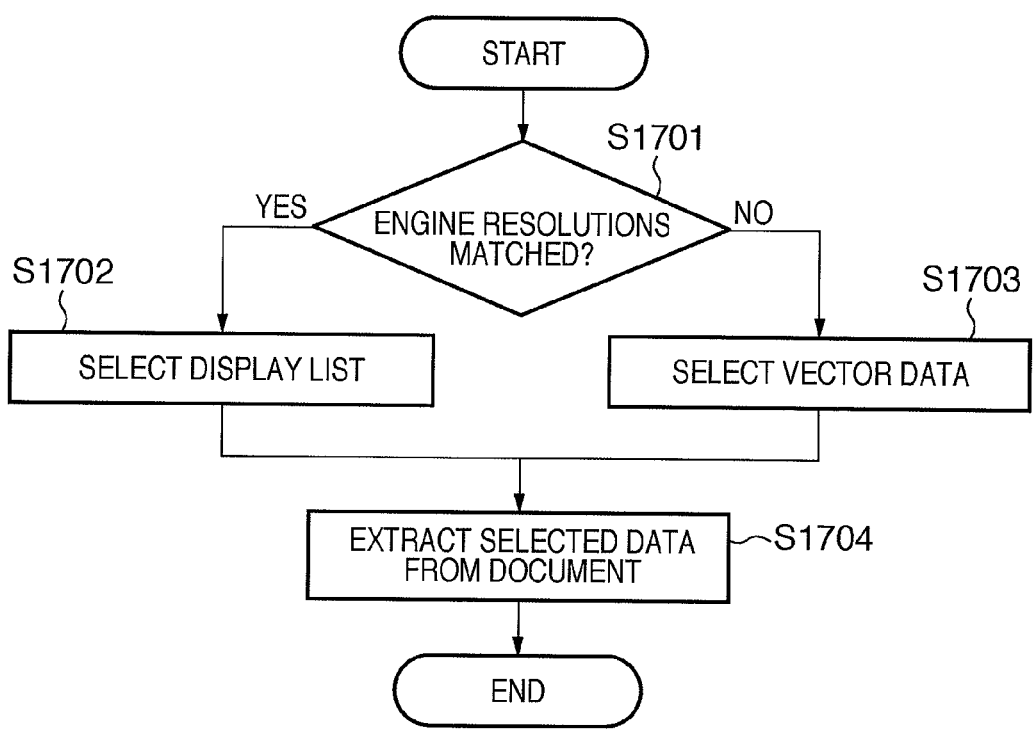
FIG. 17 is a flowchart showing the sequence of transfer data selection processing according to the first embodiment of the present invention.

Referring back to FIG. 5, the sequence of the transfer data selection processing according to this embodiment will be described below. FIG. 17 is a flowchart showing the sequence of the transfer data selection processing according to the first embodiment of the present invention. In this embodiment, upon execution of the remote copy function, the local MFP can select data to be transmitted to the remote MFP, thus consequently speeding up the remote copy processing.

The flowchart of FIG. 17 shows steps that follow step S504 in FIG. 5. In step S1701, the CPU 305 checks if the resolution of the printer engine in the remote apparatus included in the apparatus information acquired in step S504 shown in FIG. 5 matches that of the printer engine in the local apparatus (apparatus information determination means (unit)). That is, the CPU 305 checks if image output apparatus information matches image processing apparatus information associated with the local apparatus as the image processing apparatus. If the two resolutions match, the process advances to step S1702. The CPU 305 selects the display list from the generated document in step S1702, extracts the display list in step S1704, and transmits the display list to the remote apparatus in step S506 in FIG. 5. On the other hand, if the two resolutions do not match, the process advances to step S1703. The CPU 305 selects the vector data from the generated document in step S1703, extracts the vector data in step S1704, and transmits the vector data to the remote apparatus in step S506 in FIG. 5.

As described above, for example, CPU 305 of the image processing apparatus according to this embodiment has data transmission means (unit) for transmitting the display list to the remote apparatus if the resolutions of the printer engines in the local and remote apparatuses match. Therefore, the need for the process for generating a display list from vector data in the remote apparatus can be obviated, and the processing in the remote apparatus can be sped up.

Figure 18:
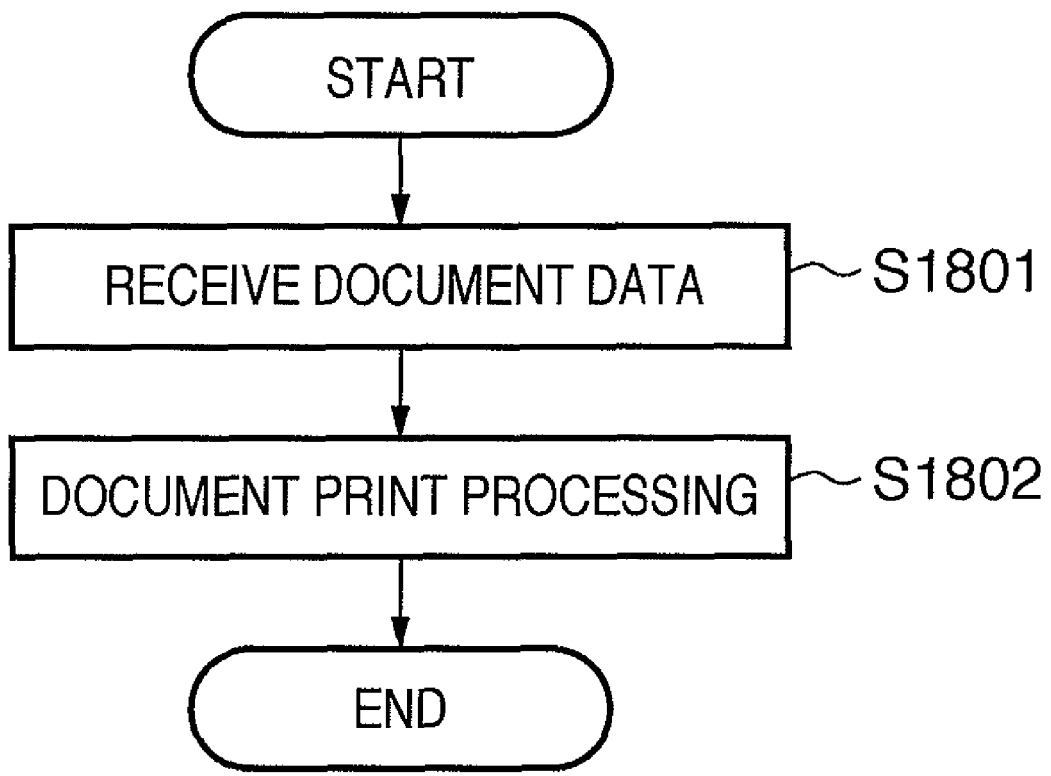
FIG. 18 is a flowchart showing processing on the remote apparatus side upon execution of the remote copy function.

The processing on the remote apparatus side upon execution of the remote copy mode will be described below. FIG. 18 is a flowchart showing the processing on the remote apparatus side upon execution of the remote copy mode. The flowchart shown in FIG. 18 is executed by the CPU 305 of the control unit 300 of the remote MFP. Alternatively, the flowchart shown in FIG. 18 may be executed by any of the function blocks included in the control unit 300 under the control of the CPU 305. Any of the MFPs shown in FIG. 1, for example, can execute remote copy reception processing when it is designated as a remote apparatus in the remote copy mode.

In step S1801, the CPU 305 receives document data from the local apparatus. The received document data includes the display list or vector data selected in FIG. 17. In step S1802, the CPU 305 executes document print processing, thus ending the processing.

A description will be given with reference to FIG. 1 again. In FIG. 1, when a remote copy is made from the MFP 1 to the MFP 2, the resolutions of the printer engines do not match. Therefore, in this embodiment, vector data is selected from a document generated by the MFP 1, and is transmitted to the MFP 2. When a remote copy is made from the MFP 1 to the MFP 3, the resolutions of the printer engines match. Therefore, in this embodiment, a display list is selected and transmitted.

Figure 19:
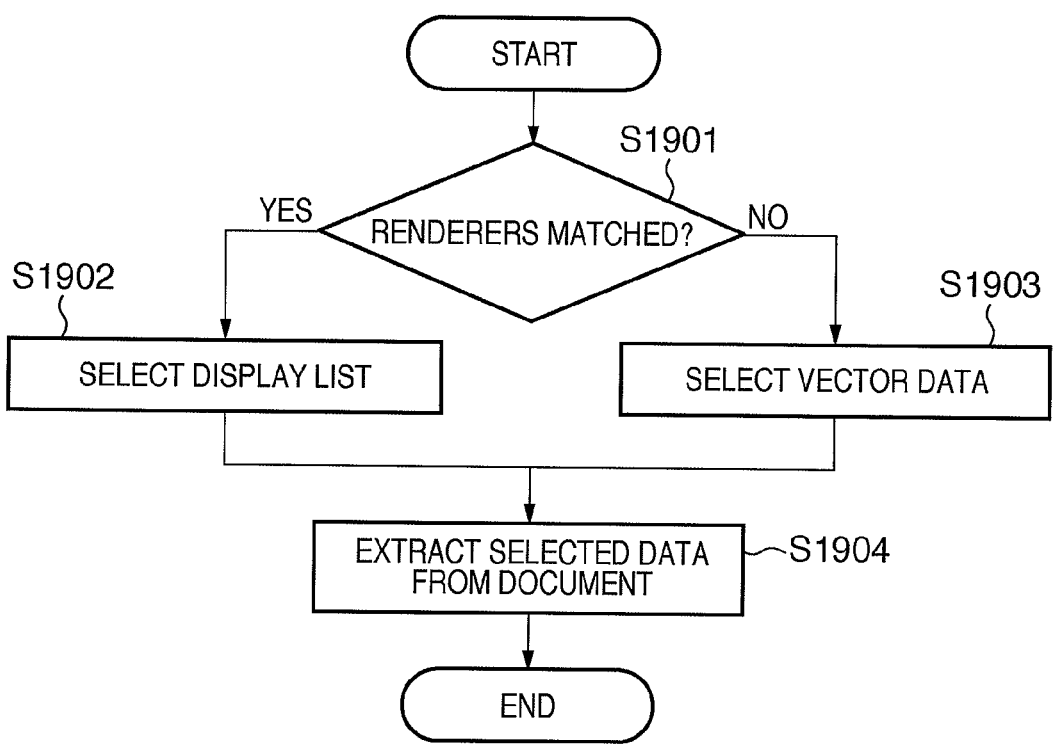
FIG. 19 is a flowchart showing the sequence of transfer data selection processing according to the second embodiment of the present invention.

FIG. 19 is a flowchart showing the sequence of transfer data selection processing according to the second embodiment of the present invention. In this embodiment, the transfer data format is selected according to a renderer type.

The CPU 305 checks in step S1901 if a renderer type included in apparatus information acquired in step S504 in FIG. 5 matches that of the local apparatus (apparatus information determination means (unit)). As described above, since the renderer is generally implemented by hardware such as an ASIC or the like, the renderer type is information depending on the function of hardware. Therefore, apparatuses having different renderer types cannot process an identical display list as instructions to the hardware. If the two renderer types match in step S1901, the process advances to step S1902, and the CPU 305 selects a display list from a document; otherwise, the process advances to step S1903, and the CPU 305 selects vector data from the document. The process then advances to step S1904, and the CPU 305 extracts the selected data from the document. In step S506 shown in FIG. 5, the CPU 305 transmits the extracted data to the remote apparatus.

In this embodiment, since the resolution of the printer engine in the remote apparatus is not referred to, even when the renderer types match, the resolutions of the printer engines in the local and remote apparatuses do not often match. Therefore, even in such a case, the display list is transmitted. The remote apparatus receives the display list, and renders the display list to bitmap data based on the resolution of the display list (that is, the resolution of the printer engine in the local apparatus). As a result, the rendered bitmap data undergoes resolution conversion to the resolution of the printer engine in the remote apparatus, and image quality deteriorates due to the resolution conversion processing. However, since the need for re-generation of a display list in the remote apparatus can be obviated, the remote copy processing can be sped up.

The transfer data selection processing in this embodiment will be described below with reference to FIG. 1. In FIG. 1, when a remote copy is made from the MFP 1 to the MFP 2, the renderer types match. Therefore, in this embodiment, a display list is selected, and is transmitted to the MFP 2. When a remote copy is made from the MFP 1 to the MFP 3, the renderer types do not match. Therefore, in this embodiment, vector data is selected, and is transmitted to the MFP 2.

Figure 20:
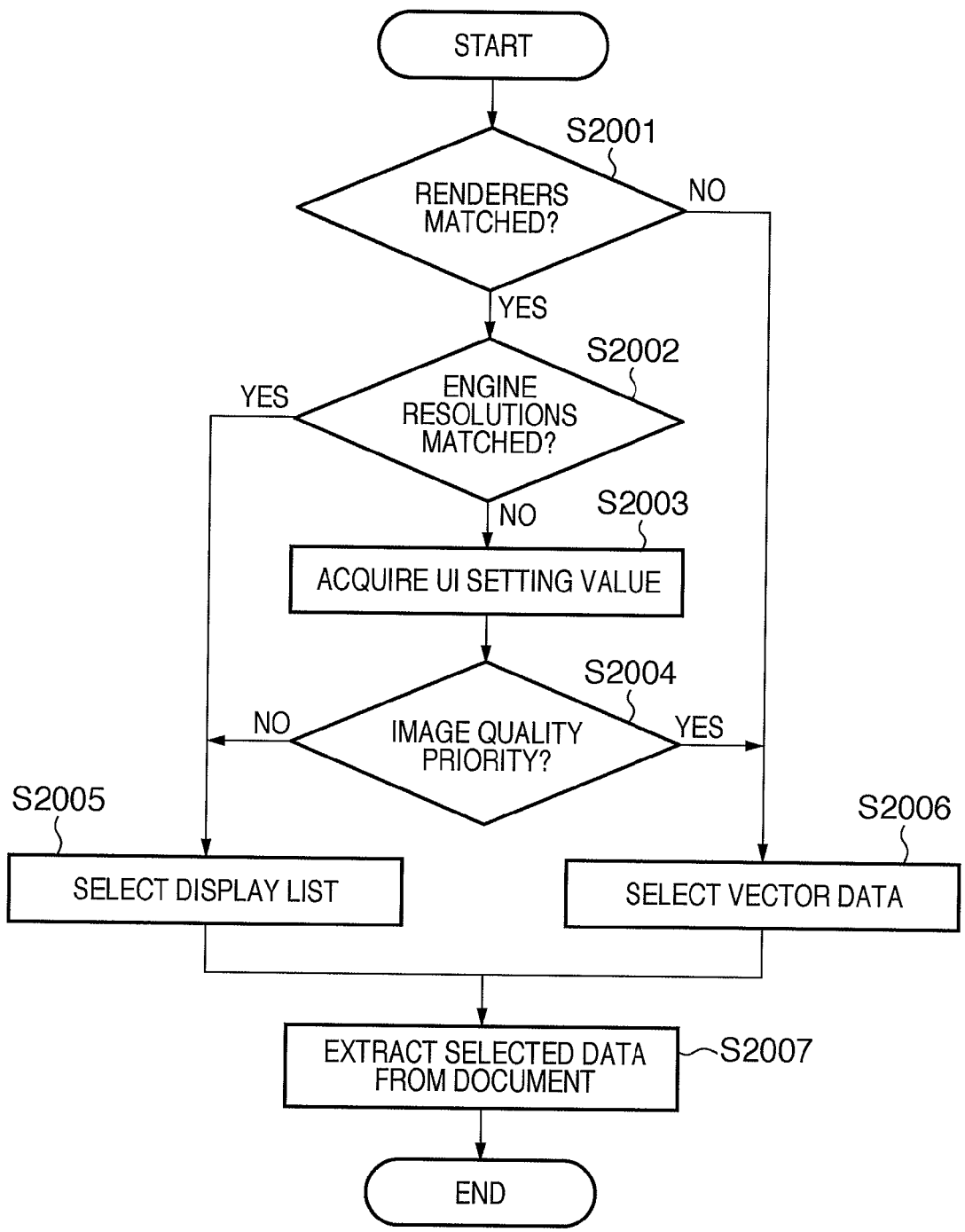
FIG. 20 is a flowchart showing the sequence of transfer data selection processing according to the third embodiment of the present invention.

FIG. 20 is a flowchart showing the sequence of transfer data selection processing according to the third embodiment of the present invention. In this embodiment, in addition to the first and second embodiments, the user can designate an image quality or speed priority mode using the operating unit 310, thus selecting the data format to be transmitted to the remote apparatus.

Figure 21:
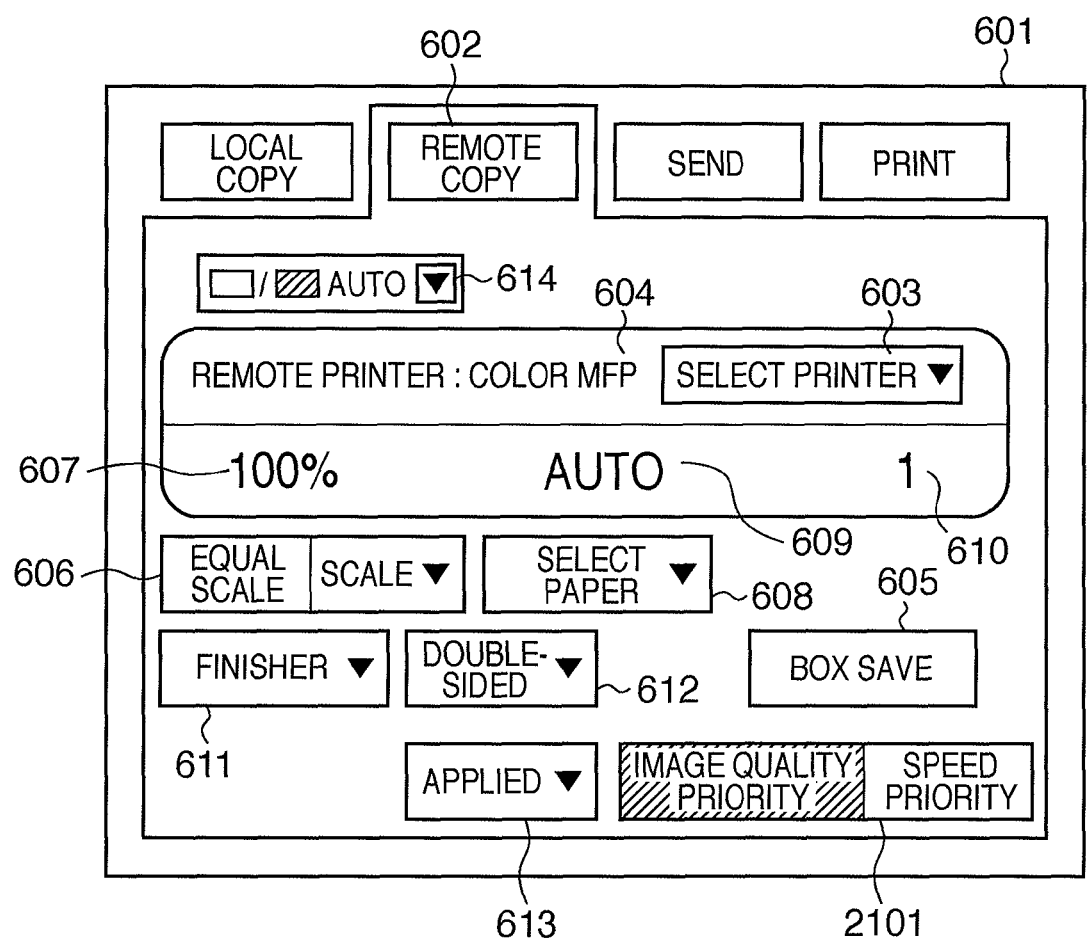
FIG. 21 shows another example of the window displayed on a display unit of the operating unit when the user gives the instruction for a remote copy in the embodiment of the present invention.

FIG. 21 shows an example of a window displayed on the display unit of the operating unit when the user inputs a remote copy instruction in this embodiment. When the resolutions of the printer engines in the local and remote apparatuses do not match, the user can designate one of image quality and speed priority modes using a button 2101. FIG. 21 shows a state in which the user selects the "image quality priority" mode.

A description will be given with reference to FIG. 20 again. FIG. 20 is a flowchart that follows step S505 in FIG. 5. The CPU 305 checks in step S2001 if a renderer type included in apparatus information acquired in step S504 matches that of the local apparatus (apparatus information determination means (unit)). If the renderer types do not match, the process advances to step S2006 to select the vector data; otherwise, the process advances to step S2002. The CPU 305 checks in step S2002 if the resolution of the printer engine included in the apparatus information matches that of the printer engine in the local apparatus (apparatus information determination means (unit)). If the engine resolutions match, the process advances to step S2005 to select the display list. If the engine resolutions do not match, the process advances to step S2003. In step S2003, the CPU 305 acquires the user interface setting value designated on the operating unit 310. The CPU 305 checks in step S2004 which of "image quality priority" and "speed priority" modes the user designates. If the user designates the "image quality priority" mode, the process advances to step S2006 to select vector data. On the other hand, if the user designates the "speed priority" mode, the process advances to step S2005 to select a display list. In step S2007, the CPU 305 extracts the selected data from the document, and transmits the extracted data to the remote apparatus as in the first and second embodiments.

In this embodiment, when the resolution of the printer engine in the remote apparatus does not match, the user can designate one of the image quality and speed priority modes. As a result, the user who attaches an importance on image quality can execute the remote copy processing with high image quality although speeding-up cannot be attained. On the other hand, the user who attaches an importance on speed can execute high-speed remote copy processing although image quality deteriorates due to the resolution conversion processing.

The transfer data selection processing in this embodiment will be described below using FIG. 1. In FIG. 1, when a remote copy is made from the MFP 1 to the MFP 2, the renderer types match. When the user selects the "image quality priority" mode, data to be transmitted is vector data. On the other hand, when the user selects the "speed priority" mode, data to be transmitted is a display list.

FIG. 22 is a flowchart showing the sequence of transfer data selection processing according to the fourth embodiment of the present invention. In this embodiment, the data format to be transmitted to the remote apparatus is selected according to a box save designation included in the remote copy settings. As has been described above, the user can designate the box save mode using the button 605 shown in FIG. 6. The flowchart shown in FIG. 22 is executed by the CPU 305 of the control unit 300 of the local MFP. Alternatively, the flowchart shown in FIG. 22 may be executed by any of the function blocks included in the control unit 300 under the control of the CPU 305.

In step S2201, the user sets an original on the scanner 301 of the MFP 1, and inputs a remote copy execution start instruction from the operating unit 310. Then, the control unit 300 receives the instruction from the user. Note that, for example, the user may set the remote copy function on the window in FIG. 6, and may input an execution start instruction by pressing a copy start button as a hardware key (not shown). In step S2202, the local apparatus scans the original set on the scanner 301 and fetches an input image as image data (bitmap data). In step S2203, the CPU 305 generates a document based on the fetched image data. In step S2204, the CPU 305 acquires the remote copy setting values designated using the user interface, and the process advances to step S2205. The CPU 305 checks in step S2205 with reference to the acquired setting values if the user designates a box save mode. If the user does not designate a box save mode, the process advances to step S2206, and the CPU 305 executes transfer data selection processing. In step S2206, the CPU 305 can execute the processing described using FIG. 17, 19, or 20. On the other hand, if the user designates the box save mode in step S2205, the process advances to step S2207, and the CPU 305 selects vector data and metadata from the document. In this embodiment, even when the data is more likely to undergo a search or to be re-transferred after it is saved in the box, since the metadata is transmitted together with the vector data, the search or the like is facilitated. In step S2209, the CPU 305 transmits the selected data to the remote apparatus.

Figure 23:
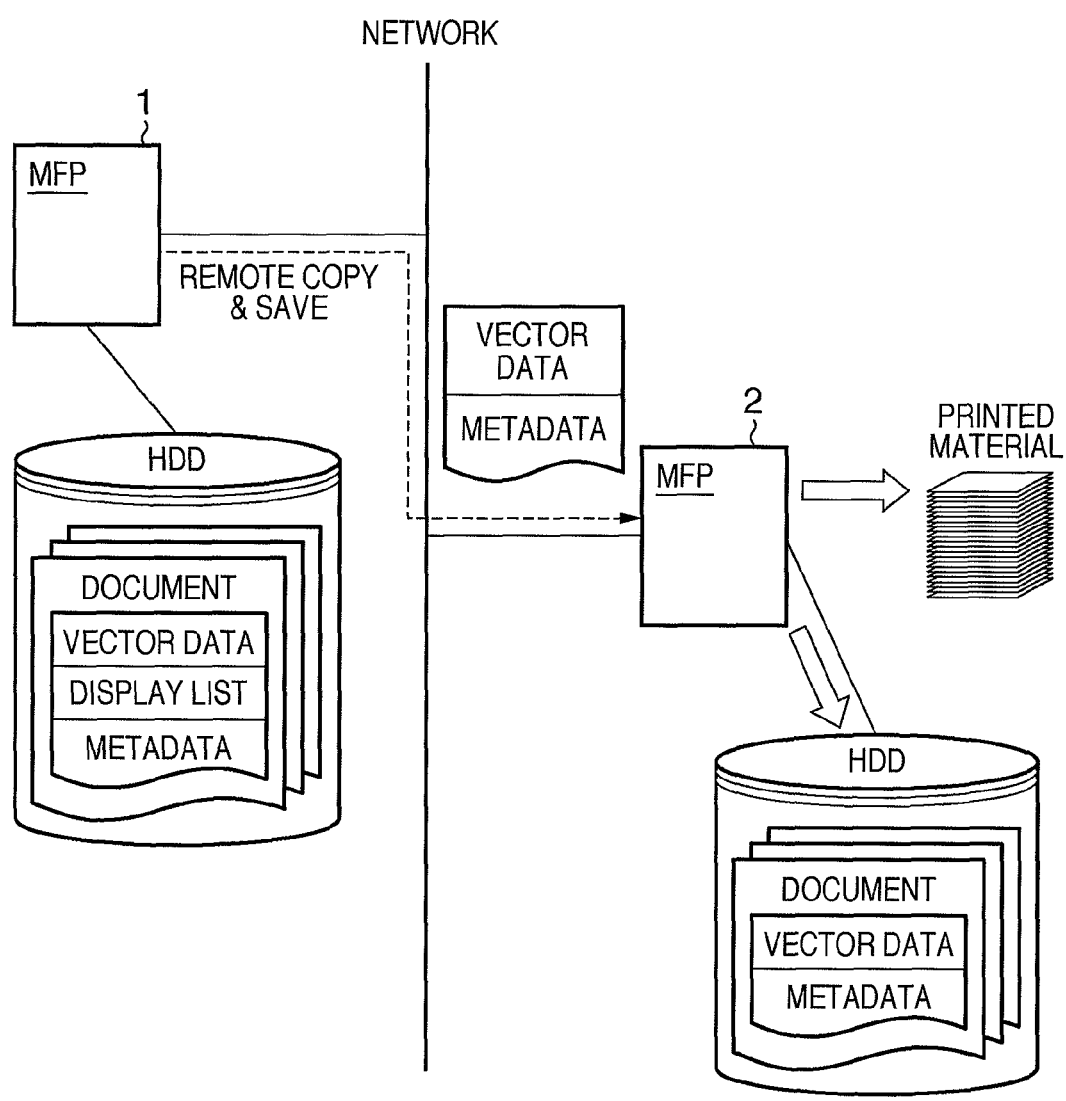
FIG. 23 is a view showing an example when the user designates a box save mode in the embodiment of the present invention.

In this embodiment, in the remote copy mode, not only the document is printed on a paper medium, but also required data is saved in the box of the remote apparatus side as metadata, thus recursively re-using document data. For example, data saved in the box on the remote apparatus side can be searched, and the document data can be further remote-copied from the remote apparatus to another remote apparatus. The transfer data selection processing of this embodiment will be described below with reference to FIG. 23. FIG. 23 shows an example when the user designates the box save mode upon execution of the remote copy processing from the MFP 1 to the MFP 2. In this case, vector data and metadata are transmitted to the MFP 2 to be printed out, and are also saved in the HDD of the MFP 2.

The present invention includes a case wherein an operating system (OS) running on a computer executes some or all of actual processes based on an instruction of program (image processing program) codes, thereby implementing the functions of the aforementioned embodiments. Furthermore, the present invention can also be applied to a case wherein the program codes read out from a storage medium are written in a memory equipped on a function expansion card or function expansion unit which is inserted into or connected to the computer. Then, a CPU or the like equipped on the function expansion card or unit executes some or all of actual processes based on the written program codes, thereby implementing the functions of the aforementioned embodiments.

The present invention may be applied to either a system constituted by a plurality of devices, or an apparatus consisting of a single piece of equipment (e.g., scanner, printer, PC, copying machine, MFP, and facsimile apparatus). The present invention is also achieved when a software program that implements the functions of the aforementioned embodiments is directly or remotely supplied to a system or apparatus, and a computer included in that system or the like reads out and executes the supplied program codes. Therefore, the program codes themselves installed in the computer may implement the present invention. That is, the present invention includes the computer program itself required to implement the aforementioned functions and processes. In this case, the form of program may be an object code, a program to be executed by an interpreter, script data to be supplied to an OS, and the like as long as they have the program function. As a recording medium used to supply the program, for example, a flexible disk, hard disk, optical disk, magneto-optical disk, MO, CD-ROM, CD-R, CD-RW, and the like may be used. Furthermore, as the recording medium, a magnetic tape, nonvolatile memory card, ROM, DVD (DVD-ROM, DVD-R), and the like may also be used.

The program may be downloaded from a Web site on the Internet or intranet using a browser of a client computer. That is, the program may be downloaded from the Web site as the computer program itself of the present invention or a compressed file including an automatic installation function to a recording medium such as a hard disk or the like. The program codes that form the program of the present invention may be segmented into a plurality of files, which may be downloaded from different Web sites. That is, program files required to implement the function processing of the present invention by a computer may be downloaded from a WWW (World Wide Web) server by a plurality of users. Also, a storage medium such as a CD-ROM or the like, which stores the encrypted program of the present invention, may be delivered to users. In this case, only users who have cleared a predetermined condition may download key information that can decrypt the encrypted program from a Web site via a network, may decrypt the encrypted program using the key information, and may install the decrypted program in their computers. The functions of the embodiments of the present invention may be implemented when a computer executes the readout program.

In the first to third embodiments, after apparatus information is acquired, the data format to be transmitted to the remote apparatus is selected. However, for example, a display list may be transmitted in advance, and if the resolutions or renderer types do not match, the remote apparatus may transmit vector data to the local apparatus. As a result, the present invention can be easily applied to a case wherein the local apparatus cannot acquire apparatus information of the remote apparatus in advance. The format of the display list is not particularly limited as long as it is resolution-dependent rendering data. Therefore, an arrangement having a renderer which uses compressed data of rendered bitmap image data as a display list so that the compressed data is decompressed at the remote apparatus may be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-183644, filed Jul. 12, 2007, which is hereby incorporated by reference herein in its entirety.

What is claimed is:

1. An image processing apparatus for transmitting output data to an external image output apparatus according to a remote copy instruction, the apparatus comprising:
    a resolution-independent data generation unit configured to generate resolution-independent data, which does not depend on a resolution, from input data;
    a resolution-dependent data generation unit configured to generate resolution-dependent data, which depends on a resolution and is used to be rendered to bitmap data, from the resolution-independent data generated by said resolution-independent data generation unit;
    a saving unit configured to save the resolution-independent data generated by said resolution-independent data generation unit and the resolution-dependent data generated by said resolution-dependent data generation unit;
    an apparatus information acquisition unit configured to acquire image output apparatus information associated with the image output apparatus;
    an apparatus information determination unit configured to determine whether or not the image output apparatus information matches image processing apparatus information associated with said image processing apparatus; and
    a data transmission unit configured to, when said apparatus information determination unit determines that the image output apparatus information matches the image processing apparatus information, transmit the resolution-dependent data as the output data.

2. The apparatus according to claim 1, wherein said data transmission unit transmits the resolution-independent data as the output data when said apparatus information determination unit determines that the image output apparatus information does not match the image processing apparatus information.

3. The apparatus according to claim 1, wherein the image output apparatus information and the image processing apparatus information respectively include information indicating output resolutions of the image output apparatus and said image processing apparatus.

4. The apparatus according to claim 1, wherein the image output apparatus information and the image processing apparatus information respectively include information indicating rasterizers included in the image output apparatus and said image processing apparatus.

5. The apparatus according to claim 1, wherein the image output apparatus information and the image processing apparatus information respectively include information indicating output resolutions of the image output apparatus and said image processing apparatus, and information indicating rasterizers included in the image output apparatus and said image processing apparatus, said apparatus information determination unit determines whether or not the information indicating the output resolution of the image output apparatus matches the information indicating the output resolution of said image processing apparatus when the information indicating the rasterizer included in the image output apparatus matches the information indicating the rasterizer included in said image processing apparatus, and when said apparatus information determination unit determines that the information indicating the output resolution of the image output apparatus does not match the information indicating the output resolution of said image processing apparatus,
    if a speed priority mode in remote copy processing is designated by a user's operation, said data transmission unit transmits the resolution-dependent data, and
    if an image quality priority mode in remote copy processing is designated by a user's operation, said data transmission unit transmits the resolution-independent data.

6. The apparatus according to claim 1, further comprising:
    an additional information data generation unit configured to generate additional information data, which is appended to the input data as additional information and is used to search for the input data, from the input data; and
    a search unit configured to search for the input data using the additional information data,
    wherein said saving unit saves the resolution-independent data, the resolution-dependent data, and the additional information data associated with the input data, in association with each other.

7. The apparatus according to claim 6, wherein when the output data is instructed to be saved in a storage area in the image output apparatus by a user's operation, said data transmission unit transmits the resolution-independent data and the additional information data as the output data, and when the output data is instructed not to be saved in the storage area in the image output apparatus by a user's operation, said apparatus information determination unit determines whether or not the image output apparatus information matches the image processing apparatus information associated with said image processing apparatus, and when said apparatus information determination unit determines that the image output apparatus information matches the image processing apparatus information, said data transmission unit transmits the resolution-dependent data as the output data.

8. An image processing method for transmitting output data to an external image output apparatus according to a remote copy instruction, the method comprising:

a resolution-independent data generation step of generating resolution-independent data, which does not depend on a resolution, from input data;

a resolution-dependent data generation step of generating resolution-dependent data, which depends on a resolution and is used to be rendered to bitmap data, from the generated resolution-independent data;

a saving step of saving the generated resolution-independent data and the generated resolution-dependent data;

an apparatus information acquisition step of acquiring image output apparatus information associated with the image output apparatus;

an apparatus information determination step of determining whether or not the image output apparatus information matches image processing apparatus information associated with an image processing apparatus; and a data transmission step of transmitting, when it is determined that the image output apparatus information matches the image processing apparatus information, the resolution-dependent data as the output data.

9. A computer-readable medium storing a program for transmitting output data to an external image output apparatus according to a remote copy instruction, the program causing a computer to function to:

generate resolution-independent data, which does not depend on a resolution, from input data;

generate resolution-dependent data, which depends on a resolution and is used to be rendered to bitmap data, from the generated resolution-independent data;

save the generated resolution-independent data and the generated resolution-dependent data;

acquire image output apparatus information associated with the image output apparatus;

determine whether or not the image output apparatus information matches image processing apparatus information associated with an image processing apparatus; and transmit, when it is determined that the image output apparatus information matches the image processing apparatus information, the resolution-dependent data as the output data.

10. An image processing apparatus for transmitting output data to an external image output apparatus according to a remote copy instruction, the apparatus comprising:

a resolution-independent data generation unit configured to generate resolution-independent data, which does not depend on a resolution, from input data;

an additional information data generation unit configured to generate additional information data, which is appended to the input data as additional information and is used to search for the input data, from the input data;

a resolution-dependent data generation unit configured to generate resolution-dependent data, which is used to be rendered to bitmap data and depends on a resolution, from the resolution-independent data generated by said resolution-independent data generation unit;

a saving unit configured to save the resolution-independent data generated by said resolution-independent data generation unit, the additional information data generated by said additional information generation unit, and the resolution-dependent data generated by said resolution-dependent data generation unit; and a data transmission unit configured to, when the output data is instructed to be saved in a storage area in the image output apparatus by a user's operation, transmit the resolution-independent data and the additional information data as the output data.

* * * * *